US007228028B2

(12) United States Patent
Tietjen

(10) Patent No.: US 7,228,028 B2
(45) Date of Patent: Jun. 5, 2007

(54) OPTICAL FIBER LINK

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/973,779

(22) Filed: Oct. 26, 2004

(65) Prior Publication Data

US 2005/0105846 A1 May 19, 2005

Related U.S. Application Data

(62) Division of application No. 10/119,653, filed on Apr. 10, 2002, now Pat. No. 6,912,341.

(51) Int. Cl.
*G02B 6/26* (2006.01)

(52) U.S. Cl. .......................................... 385/25; 385/26

(58) Field of Classification Search ............ 385/16–18, 385/25, 26
See application file for complete search history.

(56) References Cited

U.S. PATENT DOCUMENTS

| | | | | |
|---|---|---|---|---|
| 4,436,367 | A * | 3/1984 | Lewis et al. | 385/26 |
| 4,749,249 | A * | 6/1988 | Hockaday et al. | 385/26 |
| 5,955,989 | A * | 9/1999 | Li | 342/368 |
| 6,188,367 | B1 * | 2/2001 | Morrison et al. | 343/765 |
| 6,262,687 | B1 * | 7/2001 | Bai et al. | 343/757 |
| 6,407,714 | B1 * | 6/2002 | Butler et al. | 343/766 |
| 2001/0046258 | A1 * | 11/2001 | Wise et al. | 375/219 |

* cited by examiner

*Primary Examiner*—Sung Pak
*Assistant Examiner*—Tina M. Wong
(74) *Attorney, Agent, or Firm*—Plevy, Howard & Darcy, PC

(57) ABSTRACT

A system comprises at least one optical fiber that revolves around an axis when an array assembly that includes a radar array revolves around the axis. The optical fiber receives a light pattern that specifies information from the array assembly. A stationary device remains optically coupled to the optical fiber for receiving the light pattern while the optical fiber revolves around the axis.

8 Claims, 35 Drawing Sheets

135

OPTICAL FIBER LINK

RELATED APPLICATION DATA

This application is a divisional of U.S. patent application Ser. No. 10/119,653, filed Apr. 10, 2002 now U.S. Pat. No. 6,912,341, the subject matter thereof being incorporated by reference herein.

FIELD OF THE INVENTION

The present invention relates to radar array systems, and more particularly to radar arrays mounted on rotating array platforms.

BACKGROUND OF THE INVENTION

Arrays such as RF beam scanning arrays and the like are often implemented using large rotating array platforms that revolve the array in the azimuth direction. For example, the platform may rotate so as to slew the array by a predetermined azimuth angle, or to scan the entire range of azimuth angles available to the antenna at a constant angular rate. Traditional approaches to implementing rotating radar array platforms involve the use of a variety of mechanical or electromechanical parts including sliprings for providing array power, and large load-bearing bearings to support the rotating platform. However, these components are subject to significant stress, resulting in mechanical fatigue and ultimately component failure. This of course impacts on the reliability of the platform and overall, on the revolving radar antenna system.

Sliprings are a limiting feature in revolving antenna designs. Commercially available sliprings have limited current transmission capability. This limits the power that can be supplied to a conventional radar array. Future radar arrays may require 1000 amps or more, and may not be adequately supported using sliprings.

Fluid cooling presents another limitation on conventional arrays. Coolant has conventionally been transmitted to radar arrays using a rotary fluid joints, which have a tendency to leak.

An apparatus and method for providing a reliable rotating array that is not subject to such component fatigue is highly desired.

SUMMARY OF THE INVENTION

One aspect of the invention is a system comprising at least one optical fiber that revolves around an axis when an array assembly that includes a radar array revolves around the axis. The optical fiber receives a light pattern that specifies information from the array assembly. A stationary device remains optically coupled to the optical fiber for receiving the light pattern while the optical fiber revolves around the axis.

Another aspect of the invention is a system comprising: a plurality of conical reflectors positioned at respectively different levels. None of the plurality of reflectors is axially aligned with any other one of the plurality of reflectors. A first plurality of optical paths each face the apex of a respective one of the conical reflectors. A second plurality of optical paths is perpendicular to the first plurality of optical paths. Each of the second plurality of optical paths extends to a side surface of a respective one of the plurality of conical reflectors and has a 360 degree field of view.

Another aspect of the invention is a method for conducting light. A radially oriented optical fiber is revolved around the conical reflector. A light beam is directed through a first optical path towards an apex of a conical reflector. At least a portion of the light beam is re-directed using the conical reflector. The re-directed portion of the light beam is transmitted through a second optical path perpendicular to the first optical path. The second optical path begins at a side surface of the conical reflector and has a 360 degree field of view. The re-directed portion of the light beam is transmitted from the second optical path to an input of the movable optical fiber while the movable optical fiber is revolving.

Another aspect of the invention is a method for conducting light. A movable optical fiber is revolved around a side optical path that extends to a side surface of a conical reflector and has a 360 degree field of view. The light pattern is transmitted from an output of the movable optical fiber to the side optical path while the movable optical fiber is revolving. A light pattern is directed through the side optical path. The light pattern is re-directed using the conical reflector. The light pattern is directed through a longitudinal optical path that extends longitudinally from the apex of the conical reflector.

Another aspect of the invention is a method of conducting light. An array assembly that includes a radar array is revolved around an axis. A movable optical fiber is revolved around the axis when the array assembly revolves around the axis. A light pattern is transmitted through the movable optical fiber while the array assembly revolves. The light pattern specifies information from the array assembly. An optical coupling is maintained between a stationary device and the movable optical fiber while the optical fiber revolves around the axis.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION

Figure 1A:
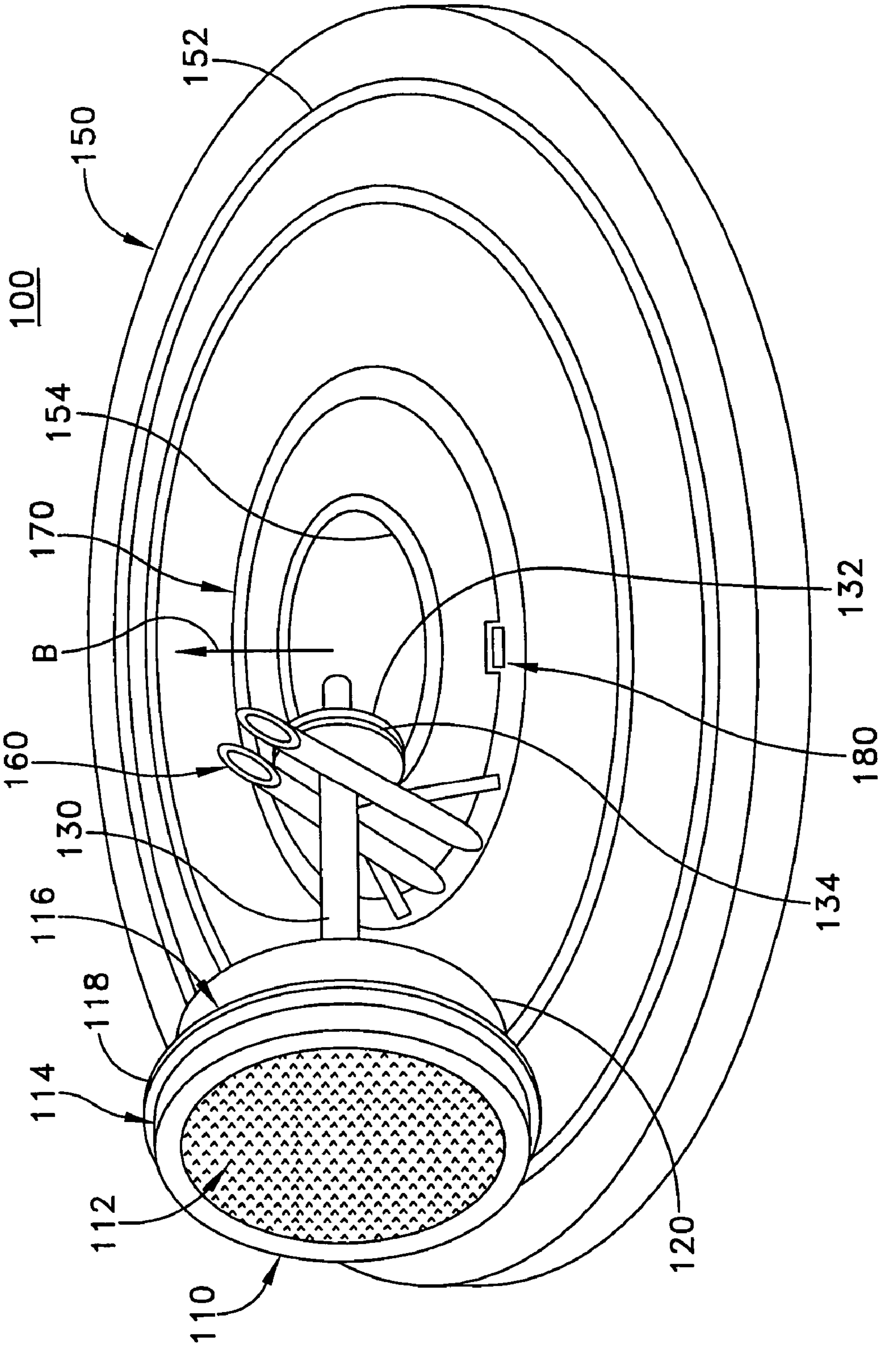
FIG. 1A is an isometric view of an exemplary radar system according to the present invention.
Figure 1B:
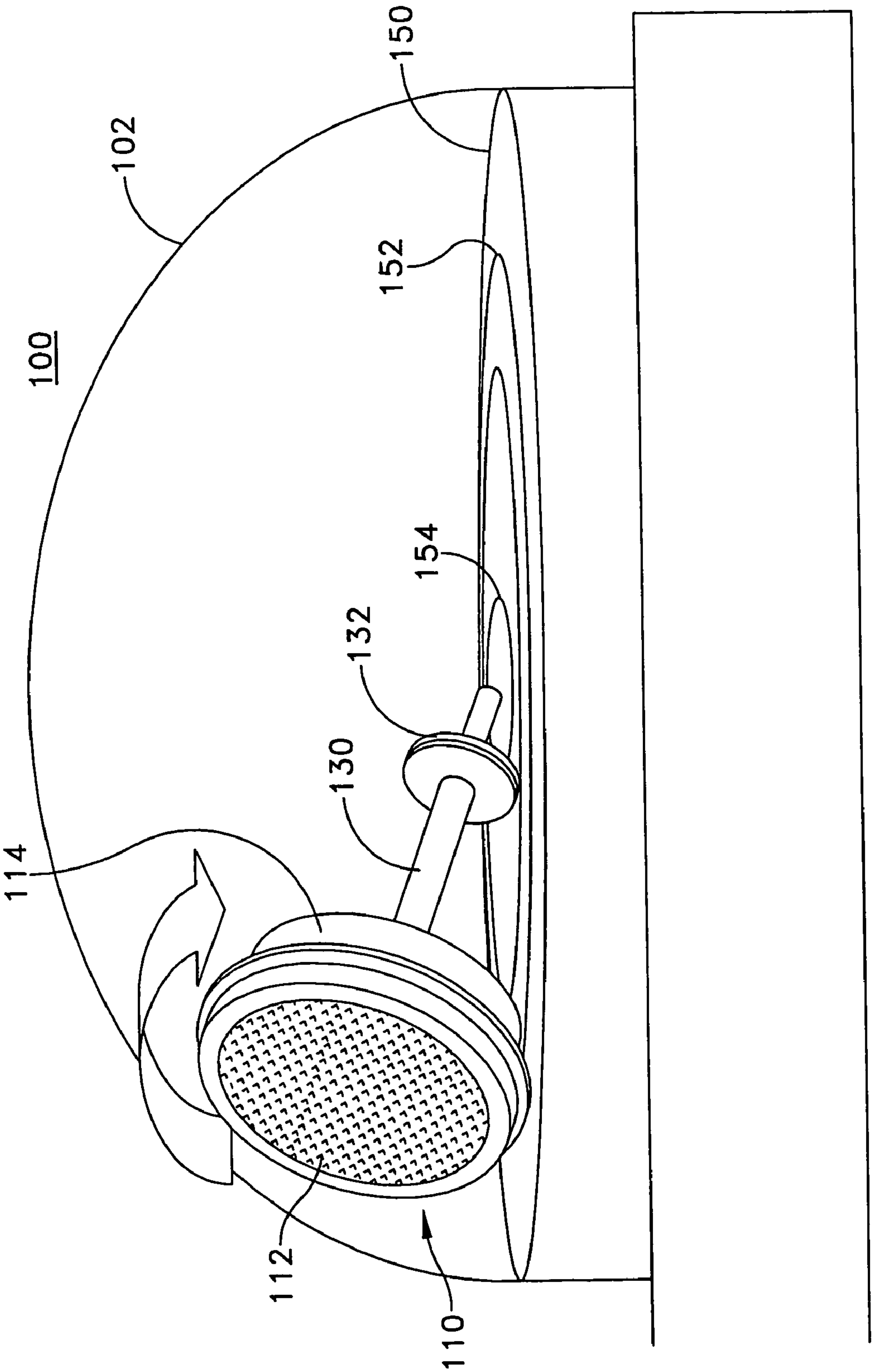
FIG. 1B shows the radar array of FIG. 1A, covered by a radome.
Figure 2:
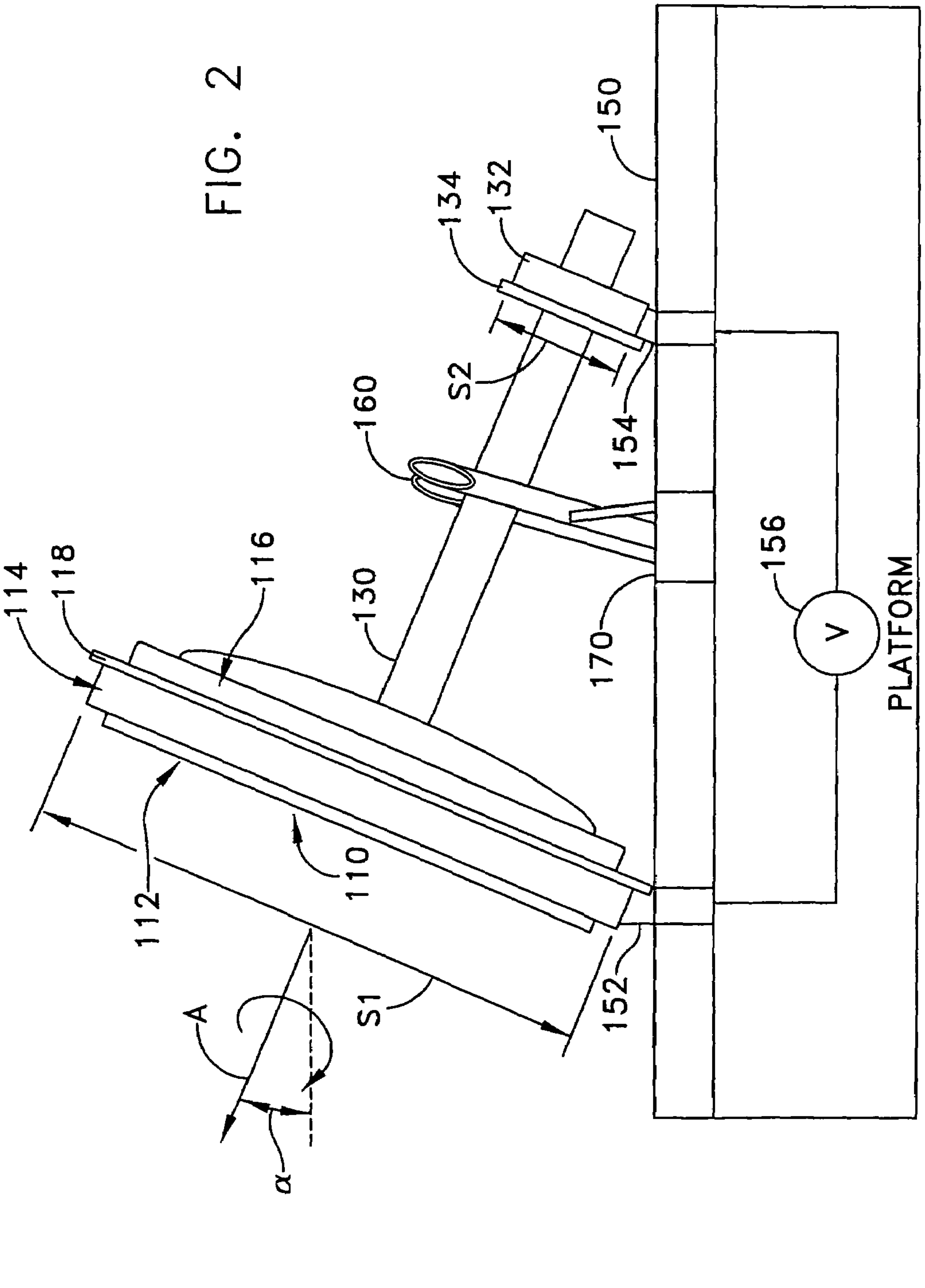
FIG. 2 is a side elevation view of the assembly shown in FIG. 1A.

FIGS. 1A, 1B and 2 show a first exemplary embodiment of a radar system 100 according to the present invention. FIGS. 1A and 2 show the array assembly 110 and platform 150. FIG. 1B also shows a radome 102 covering the assembly 110 and platform 150. The radar system 100 comprises an array assembly 110 and a platform 150. The array assembly 110 includes a radar array 112 mounted on a first circular wheel 114 having a first size S1. In addition to the array 112, the first wheel 114 may contain transmitters, receivers, processing and cooling mechanisms. The first wheel 114 has a circumferential portion adapted to engage a path 152 disposed on a platform 150 for revolving the radar array 112 about the platform. An axle 130 is coupled to the first wheel 114. The wheel 114 rotates about the axle 130 as the radar array 112 revolves around the platform 150 during operation. In a preferred embodiment of the invention, the radar array 112 rotates with the first wheel 114, as both the radar array 112 and the first wheel 114 revolve around the platform 150.

As used below, the terms "rotate" and "roll" refer to the rotation of the first wheel 114 and/or the radar array 112 about a roll Axis "A" (shown in FIG. 2) normal to the radar array, located at the center of the array. The term "revolve" is used below to refer to the "orbiting" motion in the tangential direction of the array assembly 110 about a central axis "B" of the platform 150 (shown in FIG. 1A).

The system 100 includes a means to support the array 112 in a tilted position, so that the axis "A" is maintained at a constant angle ∀ with respect to the plane of the platform 150. In some embodiments, the radar system 100 also includes a second wheel 132 coupled to the axle 130. Preferably, if present, the second wheel 132 has a second size S2 different from the first size S1 (of the first wheel 114). For example, as shown in FIGS. 1A and 2, the second size S2 is smaller than the first size S1, and the second wheel 132 engages a second path 154 on the platform 150. The first and second paths 152 and 154 are concentric circles, so that the radar array 112 is tilted at a constant angle ∀ between vertical and horizontal as it rotates around the axle 130. The first wheel has a flange 118, and the second wheel has a flange 134. The two flanges 118, 134 help maintain the array assembly 110 on the tracks 152, 154 without any fixture locking the assembly 110 in place. This configuration eliminates the need for very large support structures, such as the bearing mounted platform and bracket structures that supported conventional arrays. Without these large support structures, it is possible to eliminate the large load-bearing bearings that lay beneath the support structures. In other embodiments (not shown), instead of the second wheel 132, the end of the axle 130 opposite the radar array 112 can be supported by a universal joint or other means providing an alternative means for supporting the array in a tilted position.

In the exemplary embodiment of FIGS. 1A and 2, the first path 152 and second path 154 are conductive tracks. The circumferential portion of the first wheel 114 and the circumferential portion of the second wheel 132 are conductive. The tracks 152, 154 may be connected to power source 156 to provide power and ground to the radar array 110, similar to the technique used to provide power to an electrically powered train by way of conductive tracks. This mechanism allows the elimination of sliprings used to provide power to conventional radar arrays, which revolve around a platform without rotating around the axis normal to the array front face. The signals from the array can be transferred to by an infrared (IR) link, to improve isolation and eliminate crosstalk, so that sliprings are not required to transfer signals, either.

The exemplary system 100 includes a radar array 112 having just one face on it, but capable of covering 360° of azimuth revolution. This configuration can support a very large and heavy array 112 that is very high powered. Sliding surface contacts are not required. The contact between the first wheel 114 and the first path (track) 152, and the contact between the second wheel 132 and the second path (track) 154 are both rolling surface contacts. In a rolling contact, the portions of the wheels 114 and 132 that contact the tracks 132 and 154, respectively, are momentarily at rest, so there is very little wear on the conductive wheels and tracks. This enhances the reliability of the system. In addition, the wheels 114 and tracks 132 can be made of suitably strong material, such as steel, to minimize wear and/or deformation.

FIGS. 1A and 2 also show a drive train 160 that causes the first wheel 114 to revolve around the platform 150. The drive mechanism 160 is described in greater detail below. A variety of drive mechanisms 160 may be used. All of these mechanisms fall into one of two categories: mechanisms that apply a force to push or pull the array assembly 110 in the tangential direction, and mechanisms that apply a moment to cause the array assembly to rotate about the central axis "A" of the array 112. Both systems are capable of providing the desired rolling action that allows the array assembly 110 to revolve around the platform 150 to provide the desired 360° azimuth coverage.

The example in FIGS. 1A and 2 includes a drive mechanism 160 that pushes against the axle 130 in the tangential direction, causing the array assembly 110 to roll. Other pushing drive mechanisms (not shown) may be used to push against either the first wheel 114 or second wheel 132 in the tangential direction.

Various methods are contemplated for operating a radar system comprising the steps of: revolving a wheel 114 housing a radar array 112 around a platform 150 (wherein the radar array has a front face), and rotating the wheel about an axis "A" normal to the front face, so the wheel rotates as the wheel revolves. The method shown in FIGS. 1A and 2 includes revolving a radar array 112 around a platform 150, the radar array having a front face; and rotating the radar array about an axis "A" normal to the front face as the radar array revolves. Other variations are contemplated.

For example, the wheel 114 may rotate without rotating the radar array 112. The radar array 112 may rotate relative to wheel 114, while wheel 114 rolls around the first track 152 of the platform 150. If the rotation rate of the radar array 112 has the same magnitude and opposite sign from the rotation of the wheel 114, then the radar array 112 does not rotate relative to a stationary observer outside of the system 100. This simplifies the signal processing of the signals returned from the assembly, because it is not necessary to correct the signals to account for the different rotational angle of the array. Rotation of the radar array 112 relative to the wheel 114 may be achieved using a motor that applies a torque directly to the center of the array, or a motor that turns a roller contacting a circumference of the radar array or the inner surface of the circumference of the wheel 114.

Although the example shown in FIG. 1A includes only two wheels 114, 132 and two conductive paths 152, 154 on the platform 150, any desired number of wheels may be added to the axle 130, with a respective electrical contact on the circumferential surface of each wheel, and a corresponding conductive path located on the platform 150. The additional wheels (not shown) would be sized according to their radial distances from the center of the platform 150, so that all of the additional wheels can contact the additional conductive paths (not shown) at the same time that wheels 114 and 132 contact paths 152 and 154. The additional conductive paths may be used to provide additional current sources, to avoid exceeding a maximum desired current through any single electrical path. The additional conductive sources may also be used to provide power at multiple voltages.

Figure 33:
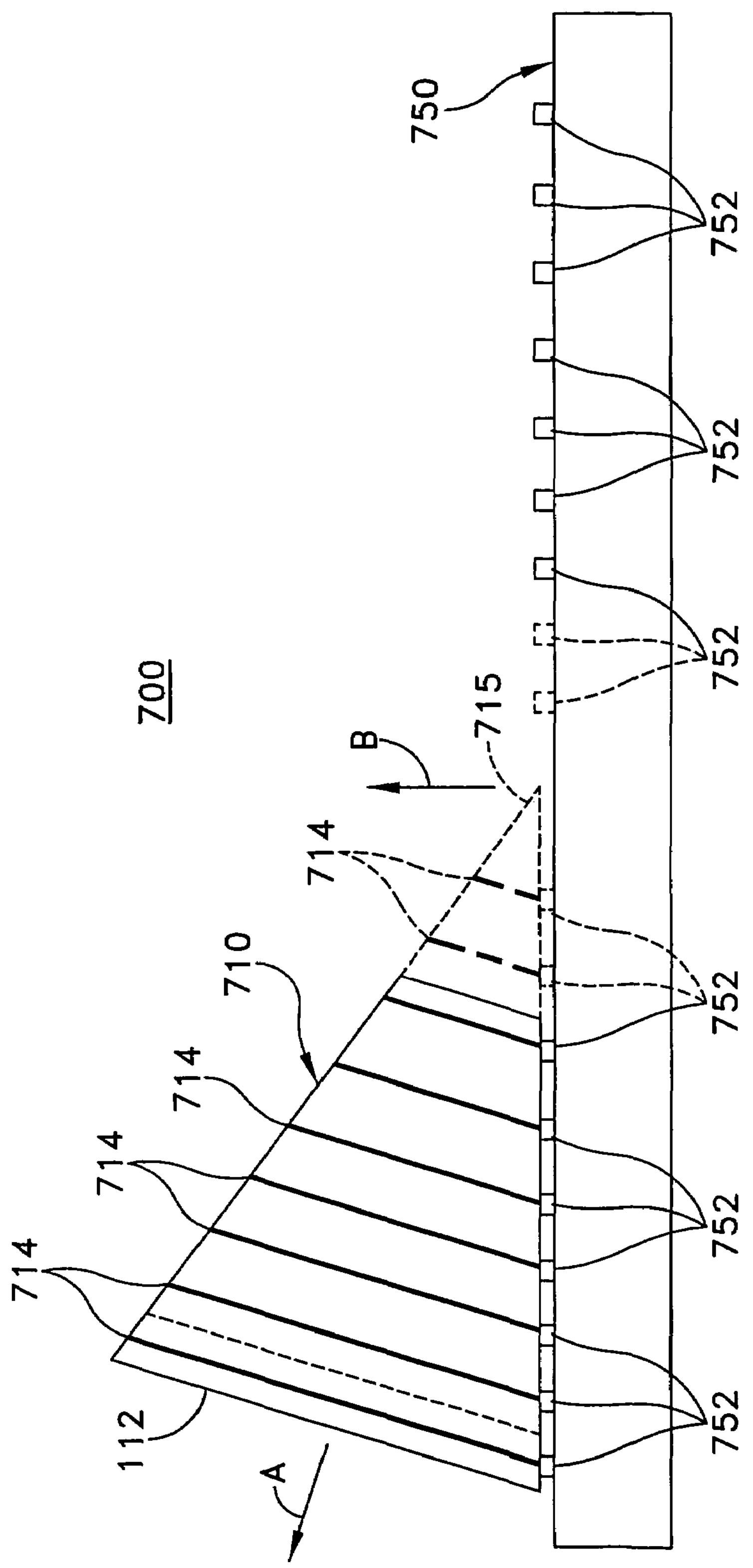
FIG. 33 shows a variation of the system, in which radar array is positioned at the base of a cone or frustum.

FIG. 33 shows another variation of the system 700, including an array assembly in which radar array 112 is positioned at the base of a housing in the shape of a circular cone 715 or frustum 710. In the frustum array assembly configuration 710, the apex section of the cone 715 (shown in phantom) is omitted. The frustum or cone configurations allow the addition of any desired number of contacts 714 on the circumferential surface. Each contact 714 maintains an electrical connection with a corresponding conductive path 752 as the cone 715 or frustum 710 rolls around its own axis "A" and revolves around the axis "B" of platform 750. These configurations can allow a very even weight distribution across the platform 750. The cone 715 and frustum 710 configurations also inherently provide a means for supporting the array 112 in a tilted position.

Depending on the interior design of the cone 715 or frustum 710, the system 700 may or may not have an axle coupled to the radar array 112. The continuous housing of cone 715 or frustum 710 provides the capability to mount components of the radar antenna system 700 to the side walls of the cone or frustum in addition to, or instead of, mounting components to an axle. Further, the cone 715 or frustum 710 may have one or more interior baffles or annular webs (not shown) on which components may be mounted.

Each variation has advantages. Although the cone 715 provides extra room for more contacts 714, the frustum 710 allows other system components to occupy the center of platform 750 such as, for example, a roll angle sensing mechanism, described further below with reference to FIG. 29.

The rotating array has many advantages compared to conventional arrays. For example, maintenance can be made easier. If an array element must be repaired or replaced, the array can be wheeled to a position in which that element is easily accessed. Also, the rotating array has very few moving parts, enhancing reliability. The rolling array assembly 110 has much lower mass and moment of inertia than the rotating platform of conventional revolving radar systems, so the azimuth drive 160 of the rolling array should not require as powerful a motor as is used for conventional rotating platform mounted radars. Also, the azimuth drive assembly does not have to support the weight of the antenna (whereas prior art rotating platform azimuth drives did have to support the weight of both the array and its support). This should improve the reliability of the azimuth drive.

Azimuth Drive

Bullring Gear and Pinion Drive

FIGS. 3–7 show a first exemplary azimuth drive 160 for a rolling radar array assembly 110 of the type described above. Azimuth drive 160 is of the general type in which the array assembly 110 is pushed in the tangential direction. The exemplary drive 160 can either rotate the array assembly 110 with a constant angular velocity, or train the array to a specific desired azimuth position.

Drive 160 includes a rotatable bullring gear 170, including a rotatable ring portion 172 rotatably mounted to the platform 150 by way of a fixed ring portion 171. Bullring gear 170 has bearings 173 for substantially eliminating friction between the fixed portion 171 and the rotatable ring portion 172. A motor 181 having a pinion gear 180 drives the rotatable ring portion 172 of bullring gear 170 to rotate.

Figure 4:
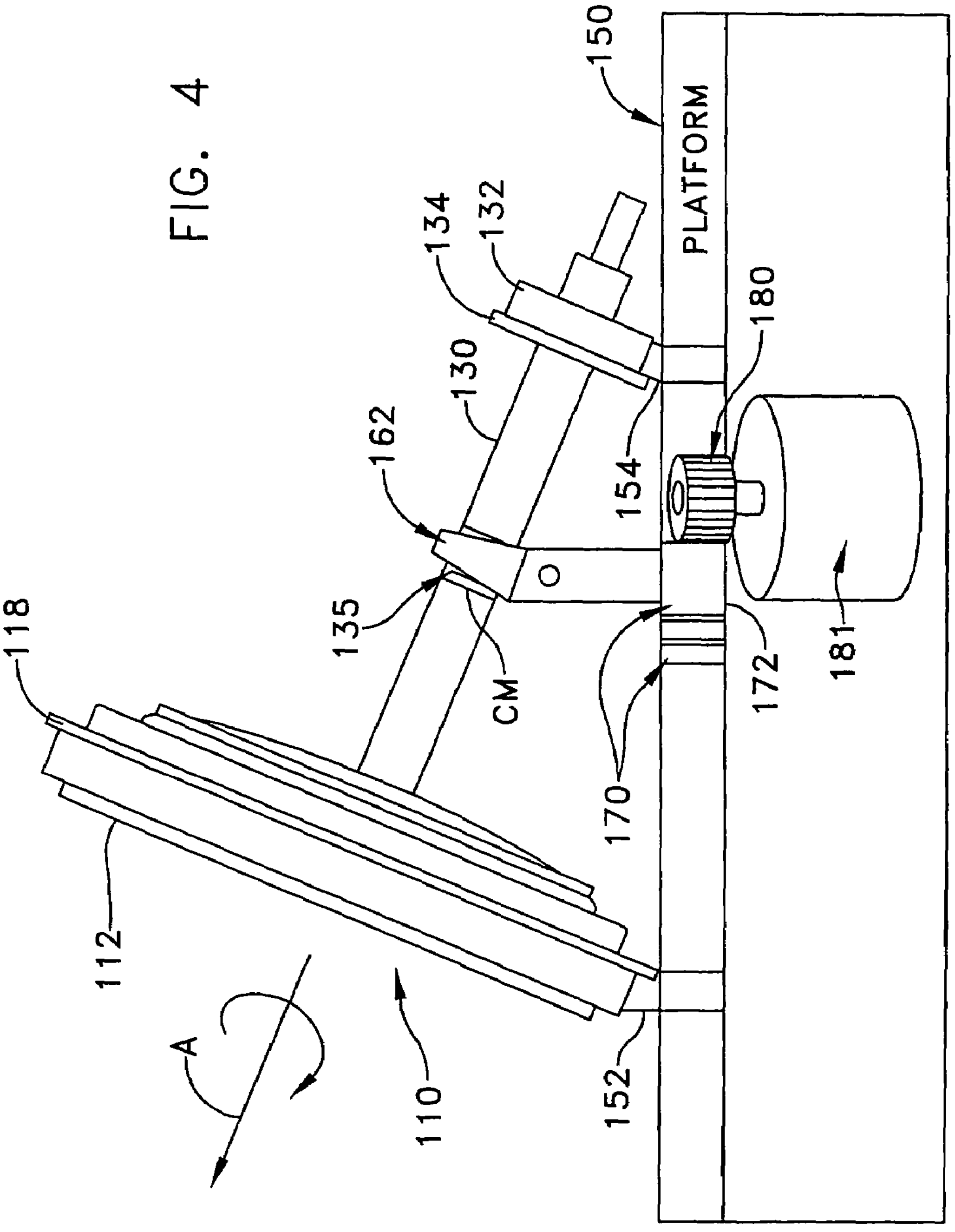
FIG. 4 is a side elevation view of the azimuth drive mechanism of FIG. 3.
Figure 7:
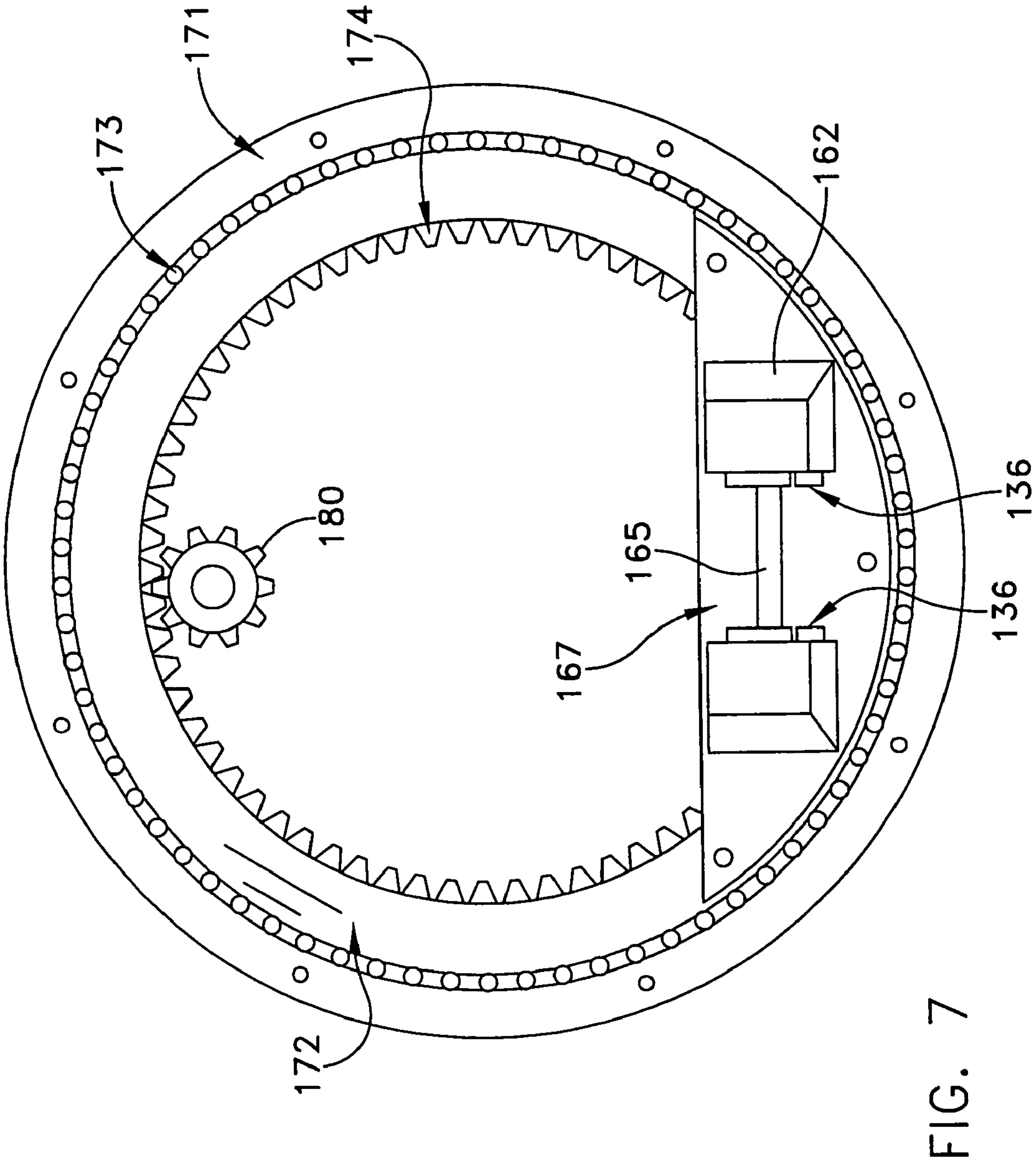
FIG. 7 is a plan view of the azimuth drive mechanism of FIG. 3.

At least one bracket portion 162 is coupled to the rotatable ring portion 172. An exemplary support platform for mounting the bracket 162 is shown in FIG. 7. A drive bracket bearing support platform 167 is mounted on a portion of the movable ring portion 172. The at least one bracket portion 162 may include one bracket arm, or two bracket arms connected by a connecting portion 165. Other bracket configurations are also contemplated. The bracket portion 162 pushes in the tangential direction against the array assembly 110 that includes the radar array 112, causing the radar array to rotate about the axis "A" normal to the radar array (as shown in FIG. 4) and revolve about the platform 150 with a rolling motion.

The bracket portion 162 is arranged on at least one side of the axle 130 for pushing the axle in the tangential direction. Although the exemplary bracket portion 162 pushes against the axle 130, the bracket portion 162 can alternatively apply the force against other portions of the array assembly, such as one or both of the wheels 114, 132 or against the conical housing 715 or frustum-shaped housing 710 shown in FIG. 33.

Figure 5:
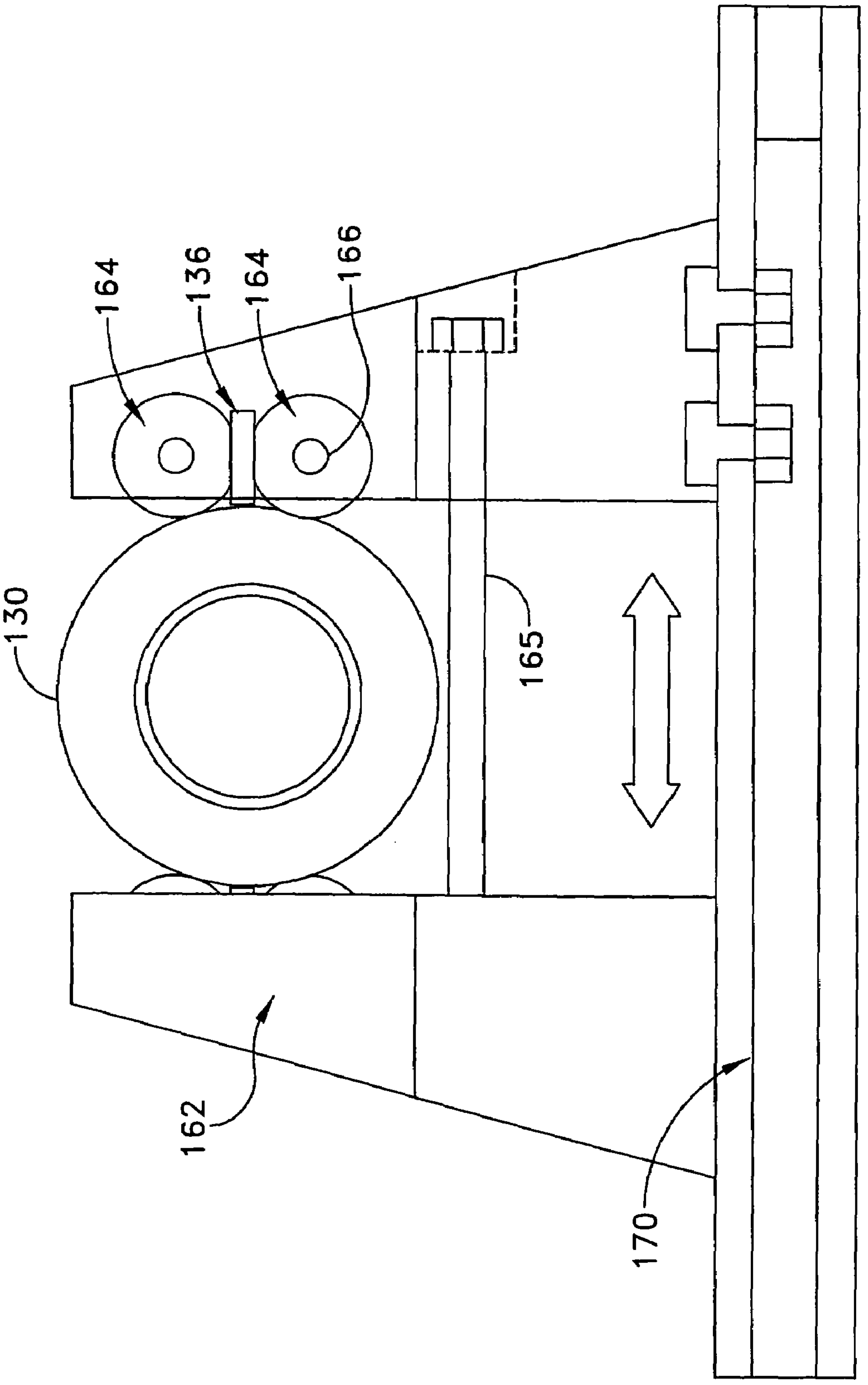
FIG. 5 is a front elevation view of the azimuth drive brackets shown in FIG. 4.

As best shown in FIG. 5, there are preferably two bracket portions 162 with at least one roller 164 on each bracket portion 162. The rollers 164 allow the bracket portions 162 to apply force against the axle 130 with substantially no friction, thus allowing the array assembly 110 to roll freely around the platform 150. In the example, each bracket portion 162 has two rollers 164 mounted on bearings 166, contacting the axle 130 above and below the center of the axle 130. If only a single roller 164 is included on each bracket portion 162, then it may be desirable to position the roller at the same height as the center of the axle 130. In either of these configurations, the resultant force applied by the one or two rollers 164 is applied in the direction parallel to the platform 150 (e.g., horizontal for a horizontal platform). In the two roller configuration of FIG. 5, the vertical force components of the two rollers above and below the axle on each side are equal and opposite to each other, canceling each other out.

In some embodiments (not shown), there may be only a single bracket portion 162 for pushing the axle 130 in one direction. In some cases, this would require the array to rotate by more than 180 degrees to reach an azimuth angle that could be achieved by a turn of less than 180 degrees if two brackets 162 are provided.

Figure 6:
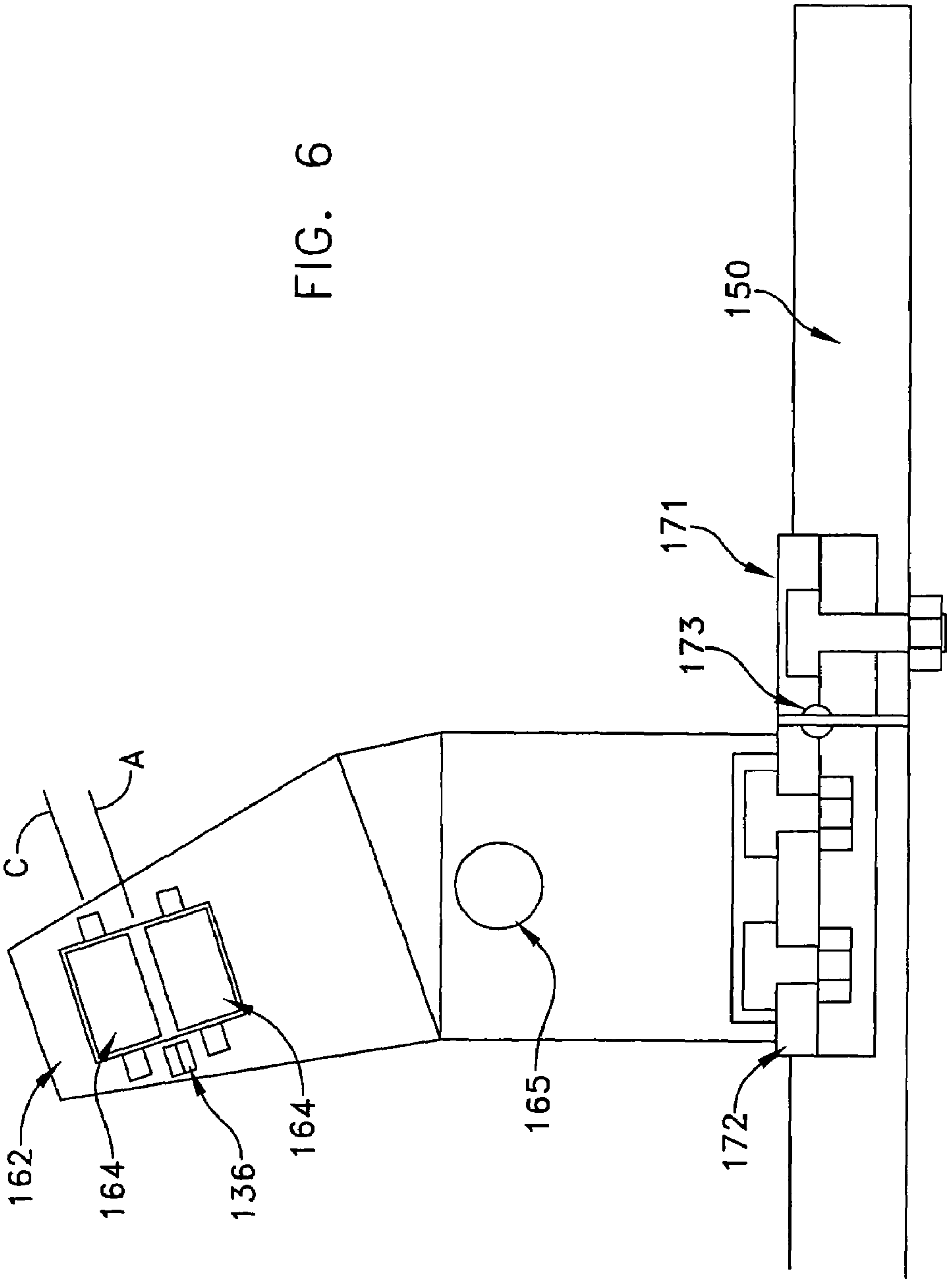
FIG. 6 is a side elevation view of the azimuth drive brackets shown in FIG. 4.

As shown in FIGS. 4 and 6, the axle 130 is tilted away from horizontal, and each roller 164 is mounted so as to have an axis of rotation "C" parallel to an axis of rotation "A" of the axle. Also, the bracket portions 162 are preferably oriented in a direction parallel to a face of the radar array 112.

The bracket design of FIGS. 4 and 6 performs well when the center of mass CM of the array is near the brackets 162. However, if the point of application of the force by the brackets 162 on the axle 130 is further from the center of mass, it is possible that a large unbalanced moment would cause the second wheel 132 to lift out of the smaller track 154. Even if the unbalanced moment is not large enough to cause the wheels 114, 132 to lift out of the tracks 152, 154, the unbalanced moment is likely to cause uneven wear of the wheels 114, 132 and/or the tracks 152, 154. For a straight bracket 162 as shown in FIG. 4, the location of the bracket is limited by the availability of a bullring gear 170 of appropriate size to allow the bracket 162 to be mounted proximate to the center of mass CM.

Figure 3:
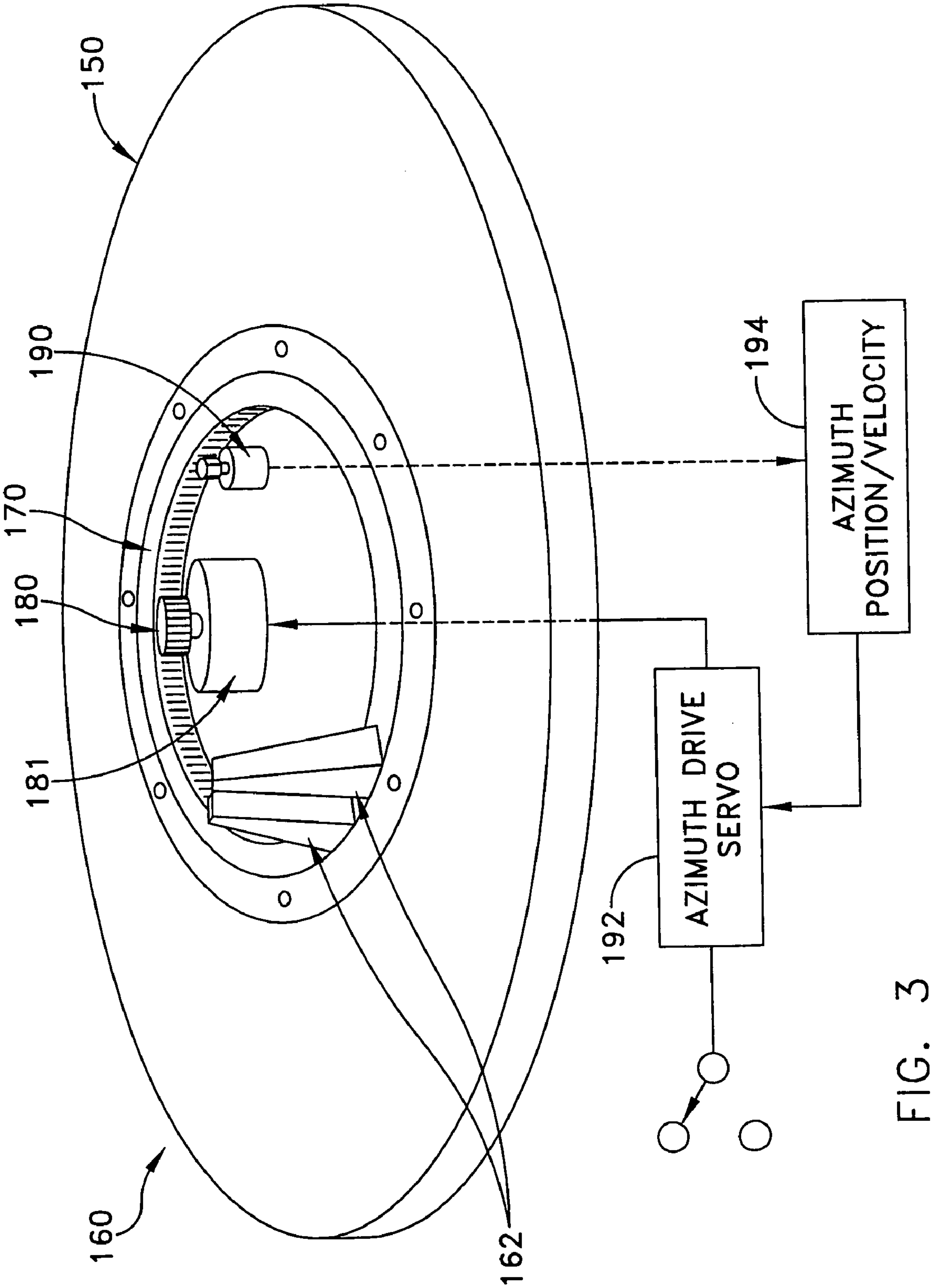
FIG. 3 is a perspective view of a first exemplary azimuth drive mechanism for the radar system of FIG. 1A.
Figure 8:
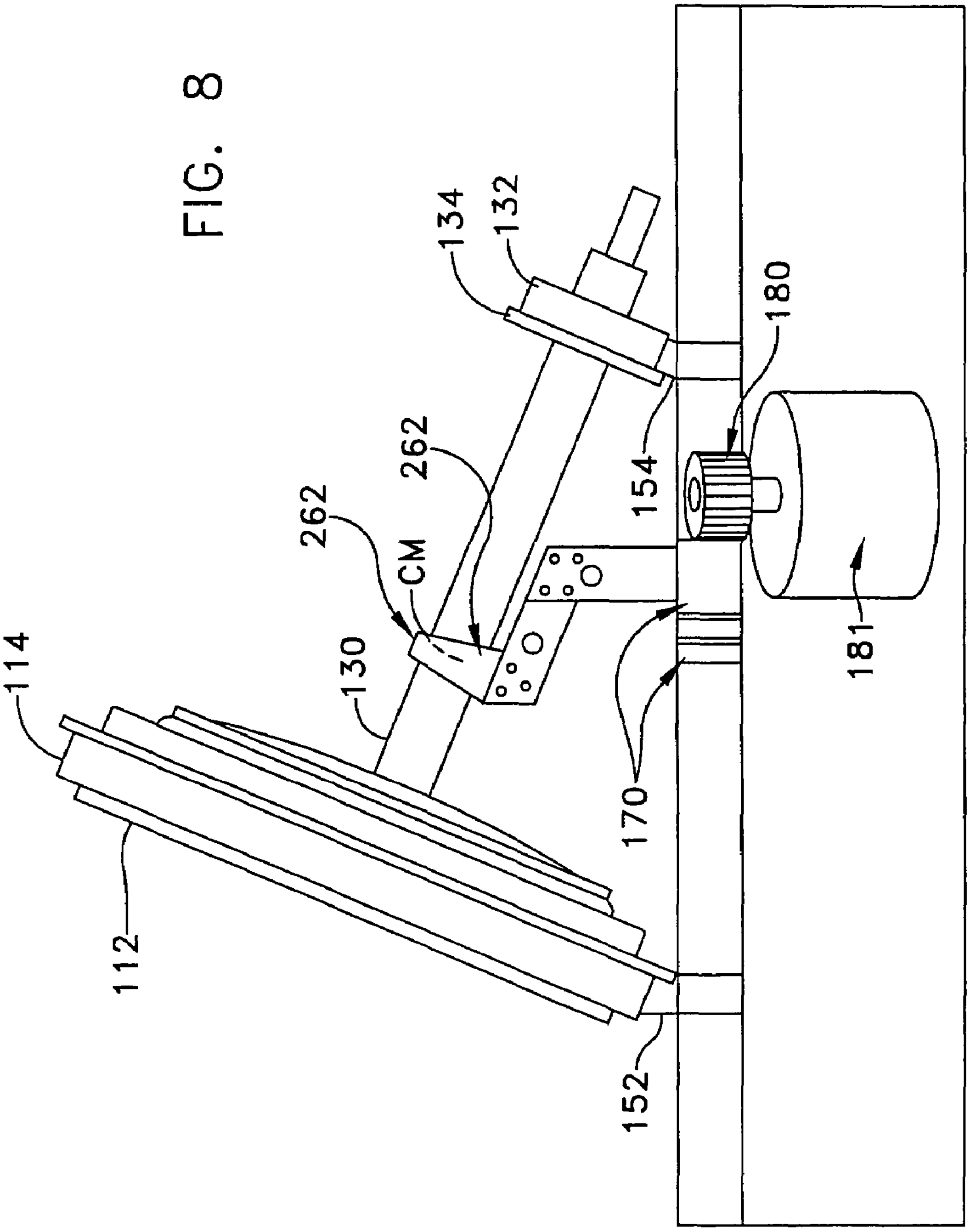
FIG. 8 is a side elevation view showing a variation of the azimuth drive bracket shown in FIG. 6.
Figure 9:
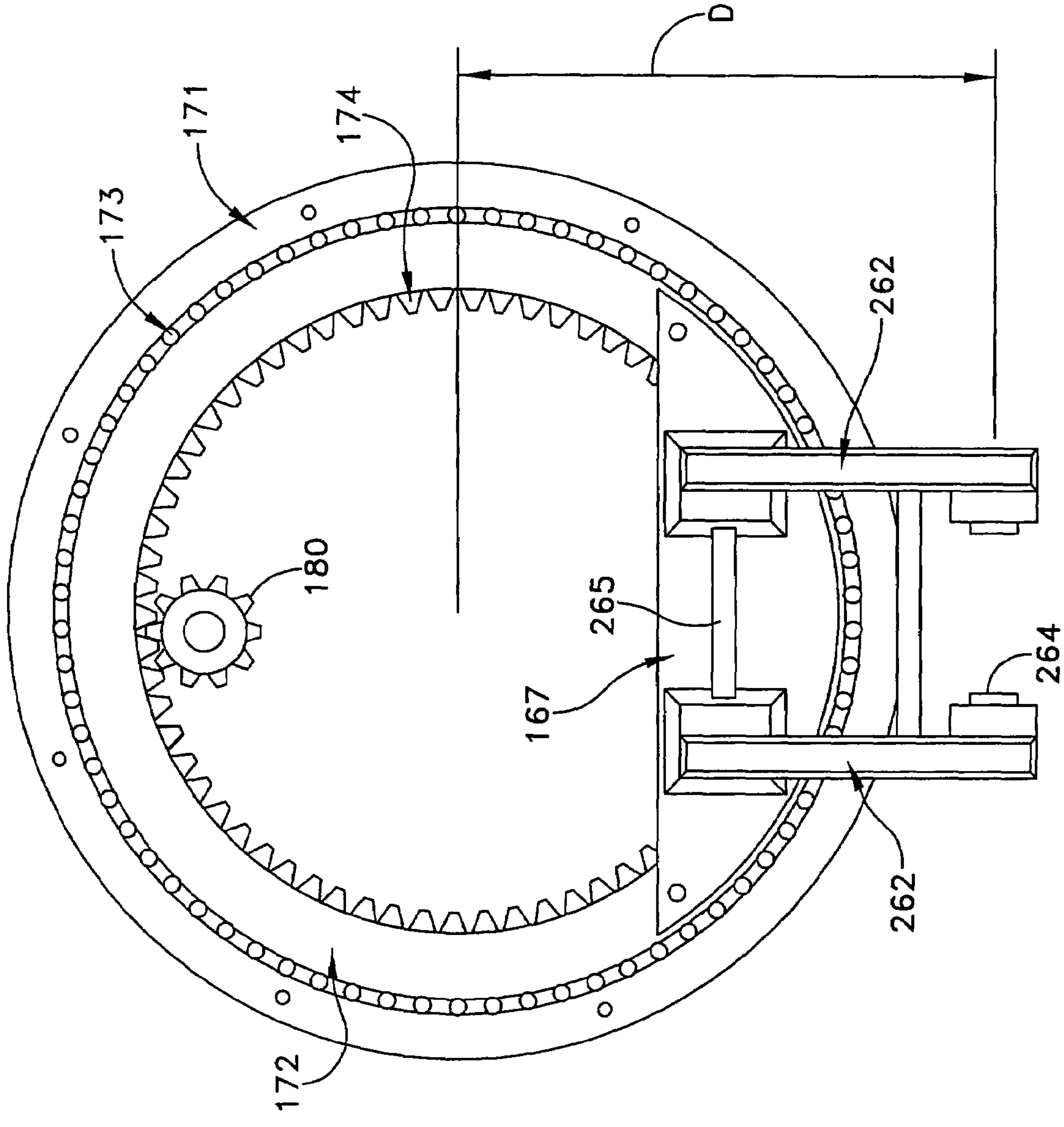
FIG. 9 is a plan view of the drive mechanism shown in FIG. 8.
Figure 10:
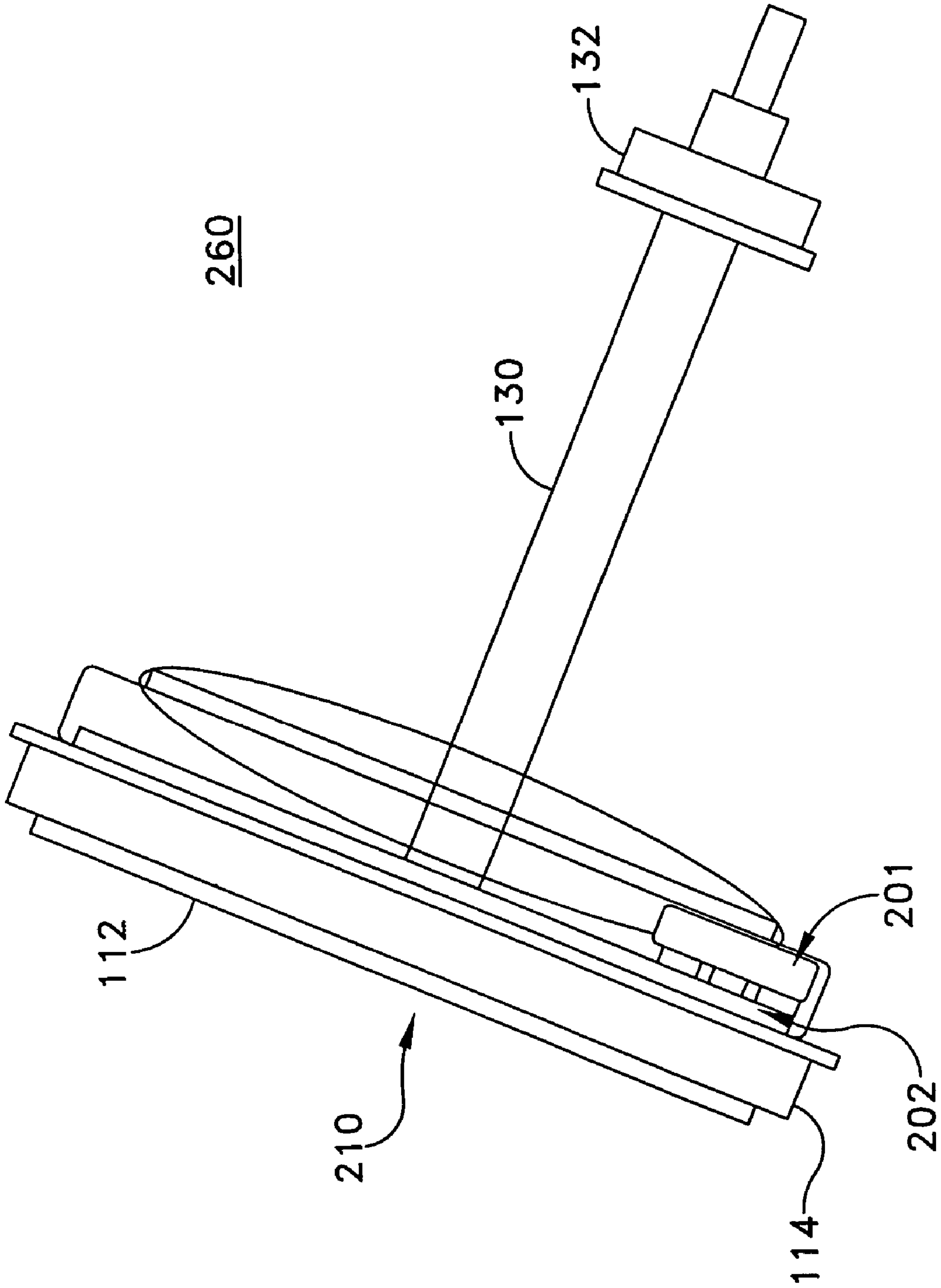
FIG. 10 is a side elevation view of a second azimuth drive mechanism.

FIGS. 8 and 9 show a variation of the azimuth drive of FIG. 3, wherein the bracket portions 262 are offset from the attachment point to the drive bracket bearing support platform 167. The bracket portions 262 are located at a radial distance from a center of the rotatable ring portion 172 greater than the radius of the rotatable ring portion. This allows the bracket rollers 164 to be positioned near the center of mass CM of the array assembly 110, regardless of the radius of the movable ring 172 of the bullring gear 170.

As shown in the drawings, it is not necessary to provide elaborate fixtures to maintain the array assembly 110 on the platform 150.

Offsetting the brackets 262 to apply the force at the center of mass CM as shown in FIG. 8 avoids the application of an unbalanced moment to the array assembly 110. Applying the force at the center of mass CM leaves the wheels 114 and 132 safely on their respective tracks. Because any unbalanced moment is eliminated, there is no need to support or restrain the end of the axle 130 opposite the array 112. The opposite end of the axle 130 can float freely.

The system 100 has an azimuth position control mechanism. An azimuth position sensor 190 is provided. The azimuth position sensor 190 may be, for example, a tachometer or a synchro. A tachometer is a small generator normally used as a rotational speed sensing device. A synchro or selsyn is a rotating-transformer type of transducer. Its stator has three 120°-angle disposed coils with voltages induced from a single rotor coil. The ratios of the voltages in the stator are proportional to the angular displacement of the rotor. An azimuth position/velocity function receives the raw sensor data from sensor 190 and provides the position as feedback to the azimuth drive servo 192. The type of sensor processing function 194 required is a function of the type of sensor used.

The azimuth drive servo 192 is capable of controlling the motor 181 to drive the rotatable ring portion 172 to cause the radar array 112 to revolve about the platform 150 at a constant angular velocity. The servo 192 is also capable of controlling the motor 181 to drive the rotatable ring portion 172 to cause the radar array 112 to revolve about the platform 150 to a specific desired azimuth position.

When the drive mechanism 160 is used to train the array 112 at a specific azimuth position, three general techniques may be used. First, the array can always be moved in the same direction. This approach may cause uneven wear on the teeth of the bullring gear 170 and pinion 180. Second, the array can be moved in a direction that requires the least travel from its current position, so that the array does not have to move through more than 180 degrees. Third, the direction of rotation can alternate each time the array is moved, so that any wear on the bullring gear 170 and 180 is more even.

Reference is again made to FIGS. 4–6. FIGS. 4–6 also show a first exemplary position sensing system, which is described in detail further below in the section entitled, "Angular Position Sensing."

Internal Gravity Drive

FIGS. 10–13 show an example of a second type of azimuth drive system 260, using a gravity drive. Items which are the same as shown in the embodiment of FIGS. 3–9 have the same reference numerals in FIGS. 10–13. This drive system 260 performs the steps of moving a weight 201 to relocate a center of mass of a wheel 114 on which a radar array 112 is mounted, allowing the wheel to roll under operation of gravity, and guiding the wheel to revolve around a platform 150, thereby to adjust the azimuth position of the radar array. When the center of mass CMW of the wheel 114 moves, a moment results, causing the wheel to rotate. The array assembly 210 seeks a new equilibrium position in which the center of mass is at the bottom, as close to the platform as possible. Thus, the array assembly 210 rolls till the center of mass CMW is directly beneath the axle 130. The principle of operation of this embodiment is to relocate the center of mass CMW of the wheel 114 to have an angular position about the axle 130 corresponding to a desired angular position of the radar array 112. The desired rotation of the array 112 in turn translates into a desired azimuth angle displacement around the platform 150.

Figure 11:
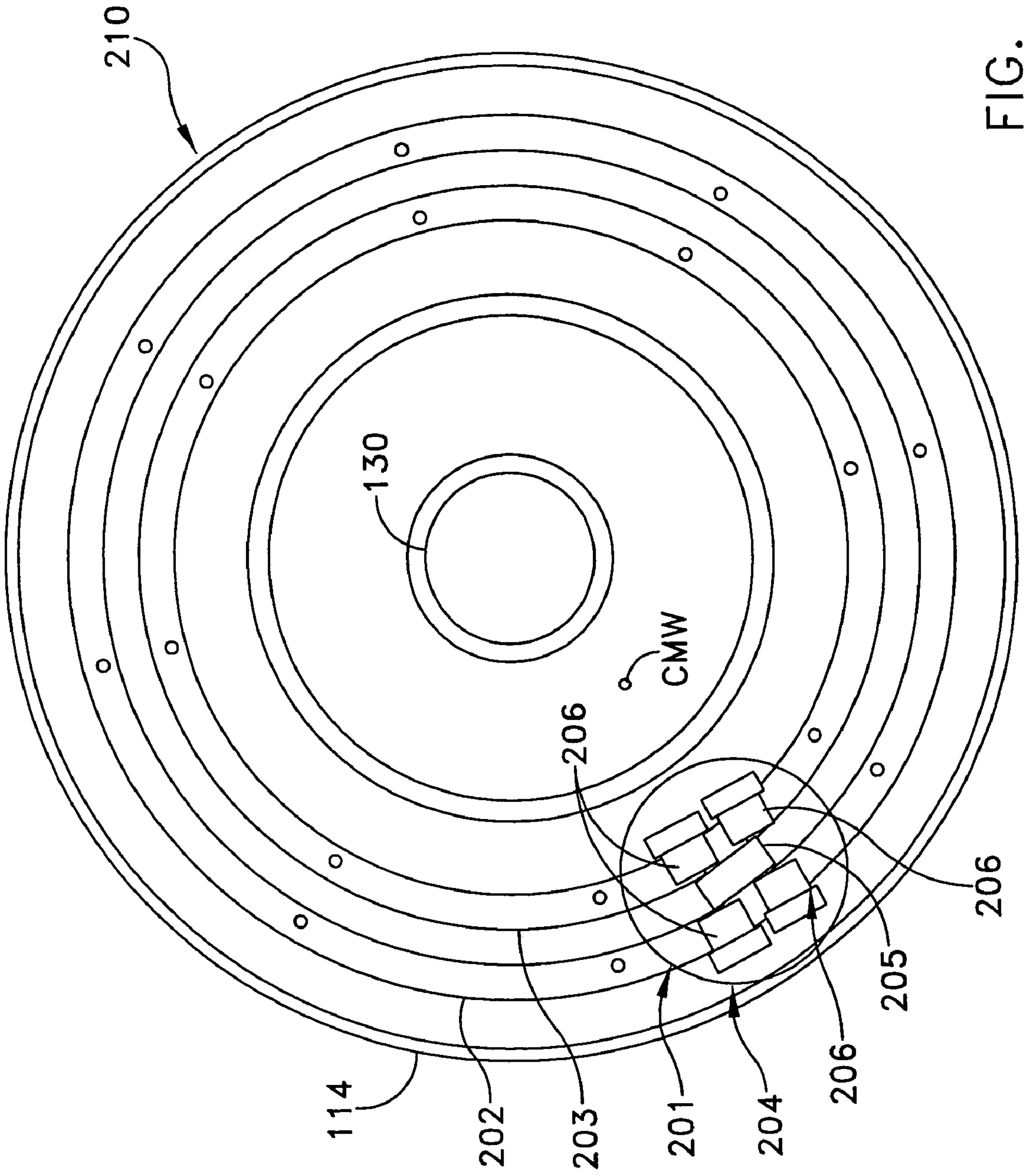
FIG. 11 is a rear elevation view of the radar array shown in FIG. 10.
Figure 12:
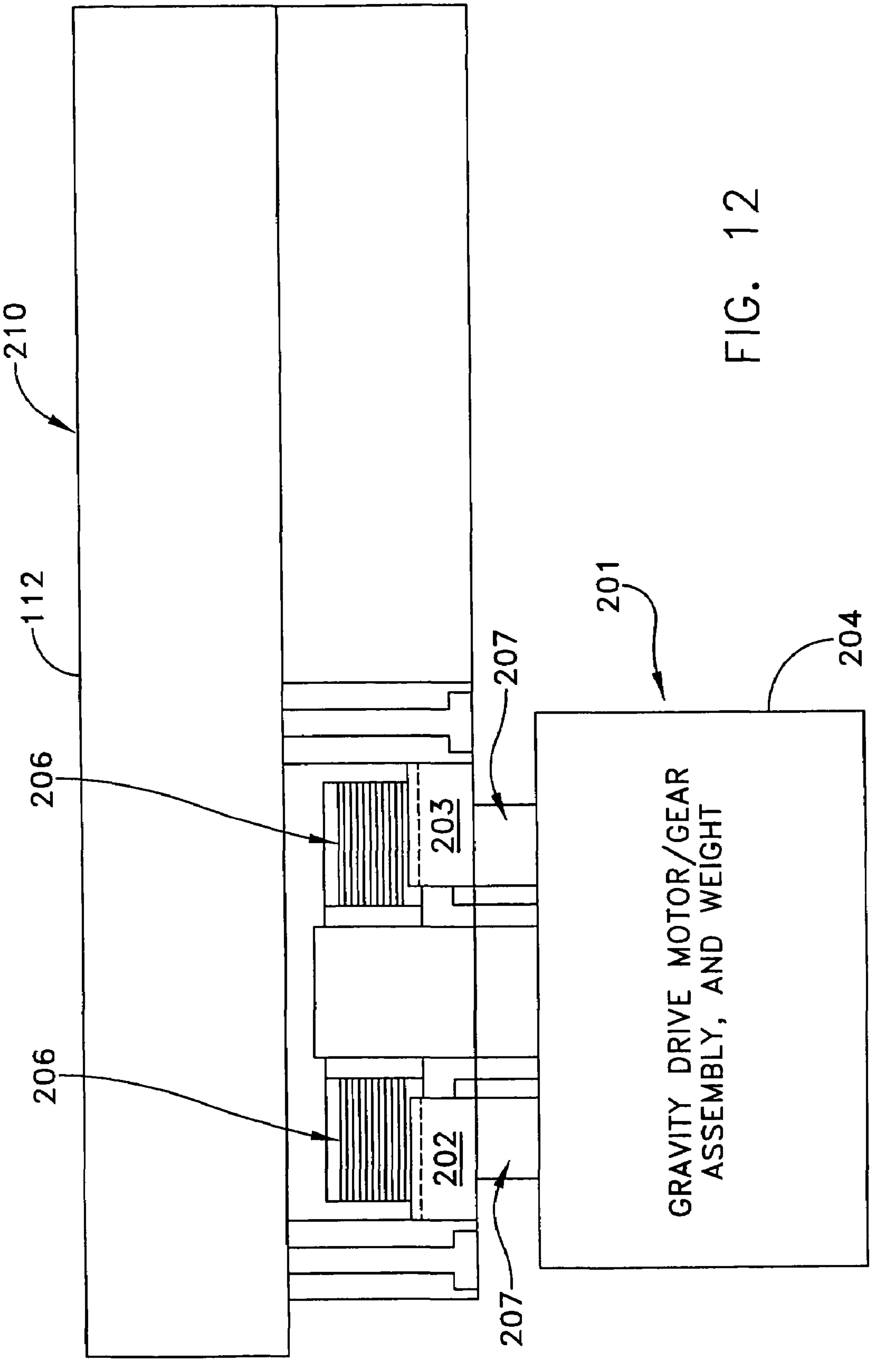
FIG. 12 is a plan view showing the motor-weight assembly of FIG. 11.
Figure 13:
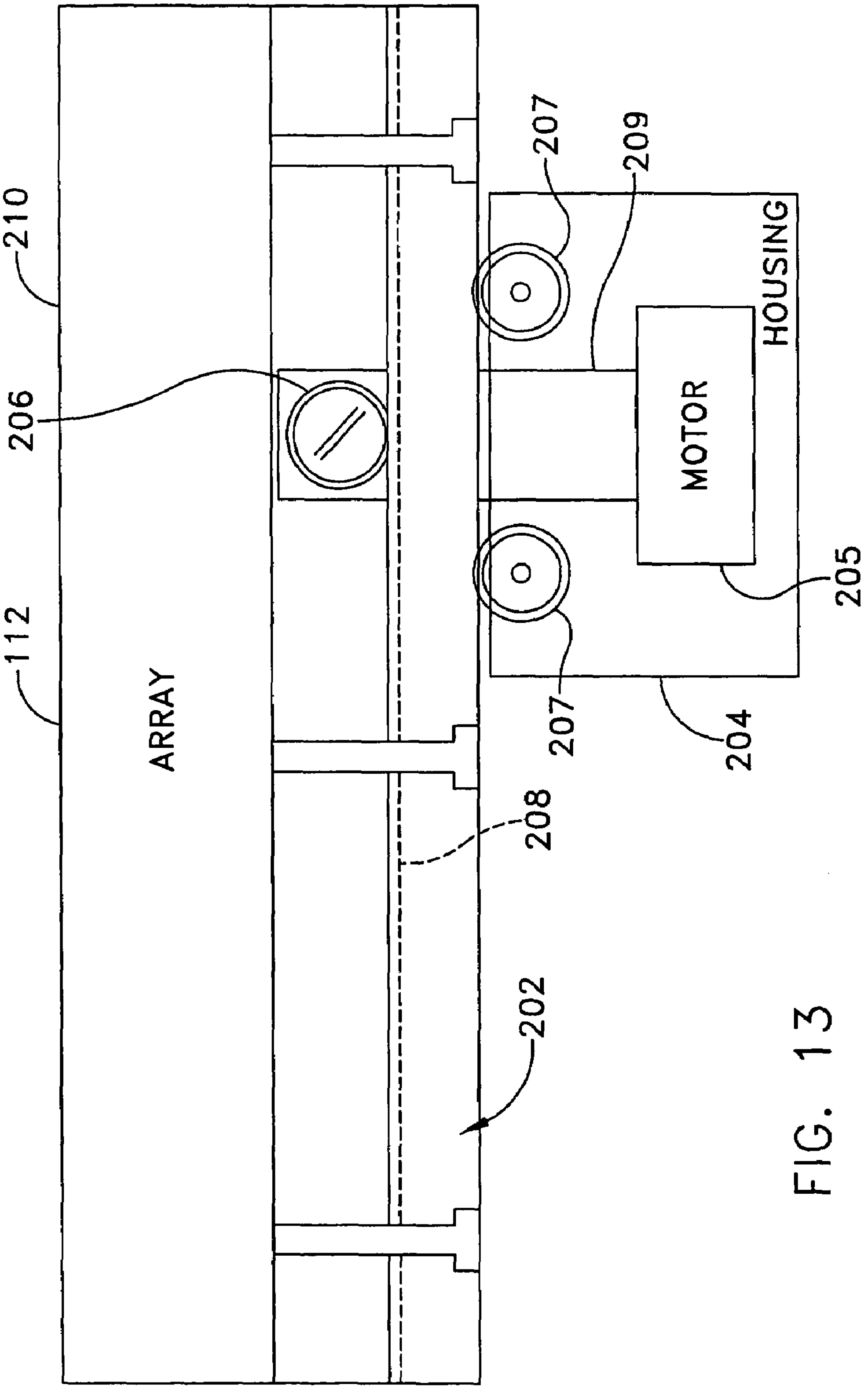
FIG. 13 is a side elevation view showing the motor-weight assembly of FIG. 11.

Drive 260 includes at least one circular track 202 mounted to a wheel 114 on which the radar array 112 is mounted. FIGS. 11 and 12 show both an outer track 202 and an inner track 203. A motorized weight assembly 201 moves along the track(s) 202, 203. A motor 205 is coupled to the circular tracks 202, 203 and is capable of moving along the tracks in the tangential direction, to relocate the center of mass CMW of the wheel 114 on which the radar array 112 is mounted. The motor 205 is contained within a housing 204, along with a gearbox 209 and flanged wheels 207. The flanged wheels 207 lock the assembly 201 to the tracks 202, 203. The gearbox 209 is connected to one or more pinions 206, which accurately move the assembly 201 relative to the tracks. A differential mechanism may be provided, so that the inner and outer pinions subtend the same angle per unit time (i.e., the linear travel of the inner pinions 206 along the inner track 203 is less than the linear travel of the outer pinions along the outer track 202). The inner pinions 206 may either be geared to rotate more slowly than the outer pinions, or the spacing of the teeth 208 (shown in phantom in FIGS. 12 and 13) on the inner track 203 may be slightly less than the spacing on the outer track 202.

In this embodiment, movement of the motor 205 causes the wheel 114 to roll along a path formed by tracks 202, 203 under operation of gravity and revolve about a platform 150. The tracks 202 and 203 are positioned close to the circumference of the wheel 114. This provides the greatest torque for any angular displacement of the motor-weight assembly 201. If the weight of the motor is not sufficient to provide the desired rotational acceleration, then the housing 204 of motor assembly 201 may provide any amount of additional weight desired.

In the embodiment of FIGS. 10–13, the circular first and second circular tracks 202 and 203 provide power and ground to the motor 205. This simplifies the design of the mechanism.

The azimuth drive of FIGS. 10–13 also includes a servomechanism (not shown in FIGS. 10–13) that controls movement of the motor 205. The servomechanism can be driven by a positional servo to cause the radar array 112 to revolve about the platform 150 to a specific desired position, or the servomechanism can be driven by a constant angular velocity servo to cause the radar array to revolve about the platform with a constant angular velocity. The control for the gravity drive mechanism of FIGS. 10–13 is somewhat more complex than the control of the bullring gear 170 described above.

For example, consider the case where it is desired to move the array 112 to a fixed position. If the motor-weight assembly 201 is moved away from directly beneath the axle 130 to any other fixed position, an underdamped natural oscillator is formed. That is, the array 112 would tend to roll past the equilibrium position and then roll back past the equilibrium position again, and the cycle is repeated. To prevent the oscillations, the motor 201 can be moved backwards before the array reaches the desired position. This causes the assembly to decelerate as it reaches its destination.

One of ordinary skill in the control arts can readily provide a control circuit to control the weight assembly to avoid overshooting the destination angle. For example, a tachometer may be placed on the axle 130 to measure the relative rotational rate between the motor assembly 201 (including the weight 204, the drive motor 205 and the gear box 209) and the axle 130, and the difference can be fed to a constant velocity servo. Then, position feedback (described further below) can be provided to a position servo. This will allow the array assembly 210 to be slewed to a certain spot. To keep at a constant velocity, the tachometer may be used. The tachometer output can be integrated to provide position information. Alternatively, because the position of the array can be measured, the derivative of the position provides the velocity. To use as few mechanical parts as possible optical feedback can be used to obtain position or velocity feedback for the servo. Operation is similar to the first servo diagram in FIG. 3, except instead of the position sensor being a synchro or tachometer it could just be an optical feedback.

When the internal gravity drive mechanism 260 is used to train the array 112 at a specific azimuth position, three general techniques may be used. First, the motor-weight assembly 201 (and the array 112) can always be moved in the same direction. This approach may cause uneven wear on the tracks 202, 203 and pinions 206. Second, motor-weight assembly 201 (and the array 112) can be moved in a direction that requires the least travel from the current position of the motor-weight assembly. In some cases, where the wheel 114 travels by a distance greater than the circumference of the track 202, the assembly 201 must move more than 360 degrees around the track 202 regardless of the direction chosen. In the third scheme, the direction of rotation of motor-weight assembly 201 can alternate each time the array 112 is moved, so that any wear on the tracks 202, 203 and pinions 206 is more even.

Using the internal gravity drive to operate the array in a constant azimuth velocity mode is simpler. The motor-weight assembly 201 is simply rotated around the tracks 202, 203 at the same angular rate as the desired rotational speed of the wheel 114 to provide the desired azimuth velocity. That is, to have the radar array 112 revolve around the platform with an azimuth angle velocity $T_1$ (in radians per second) about the axis "B", the wheel 114 must roll at a (linear) speed of $T_1$*R1, where R1 is the radius of the track 152 on which wheel 114 moves. For the wheel 114 to roll at this linear speed, the angular speed $T_2$ of the wheel 114 about its own axis "A" must be given by $T_2=T_1$*R1/R2, where R2 is the radius of the wheel 114. The motor-weight assembly 201 must then revolve around the tracks 202, 203 with the same angular velocity $T_2$. It is understood that there is a transient response, as the wheel 114 speeds up from a velocity of zero to a velocity of $T_2$ The transient response is recognized and factored into the radar signal processing, using array angular position sensing, described further below.

Although the exemplary internal gravity drive includes the tracks 202, 203 on a wheel 114 at the end of an axle 130, the wheel may be a separate wheel attached to the same axle.

In the case of a conical array assembly 715 or a frustum shaped array assembly 710 of the types shown in FIG. 33, the wheel may be at or near the base of the conical or frustum shaped housing, in which case the radar array 112 may be mounted to the wheel. Alternatively, the wheel to which the gravity drive is mounted may be an annular flange or baffle inside such a conical or frustum shaped array assembly.

Internal Gravity Drive with Moment Arm

Figure 14:
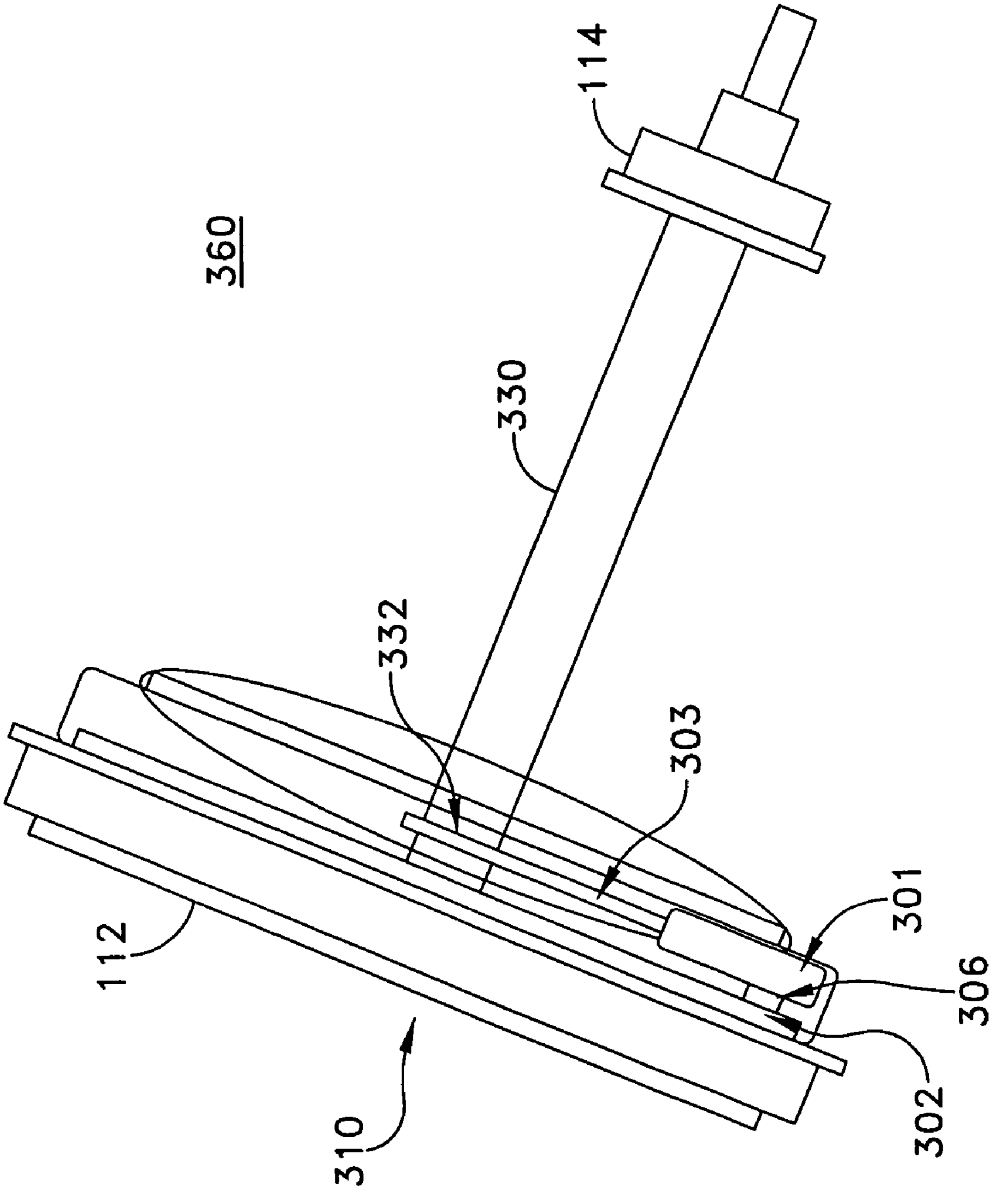
FIG. 14 is a side elevation view of a variation of the azimuth drive mechanism of FIG. 10.
Figure 15:
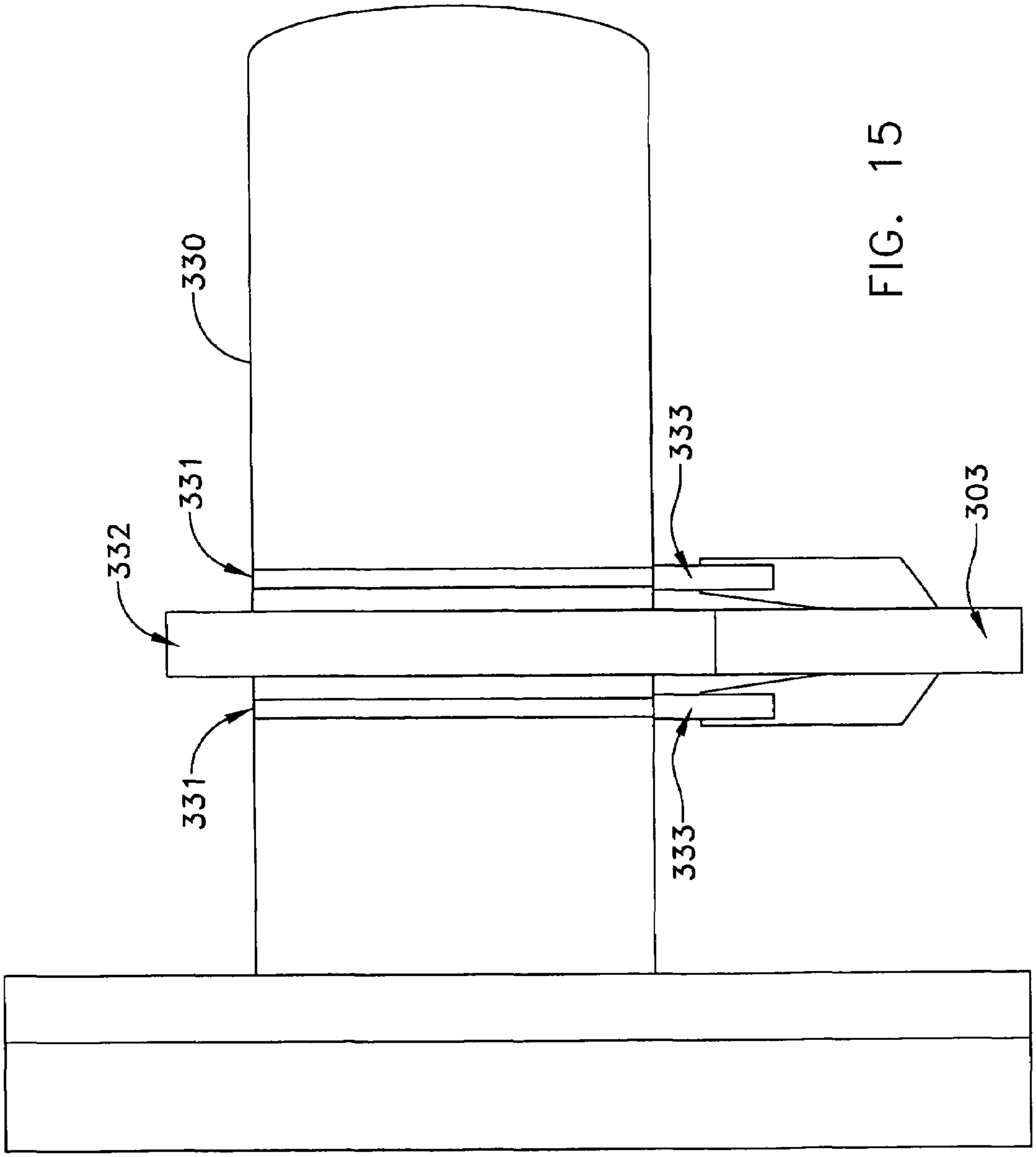
FIG. 15 shows a detail of the drive mechanism of FIG. 14.

FIGS. 14 and 15 show another variation 360 of the internal gravity drive. The drive 360 includes a moment arm 303 having one end pivotally mounted to the axle 330 (by a bearing 332 rotatably mounted on the axle 330) and another end connected to the motor assembly 301. The moment arm 303 supports the motor assembly 301, while allowing the motor to revolve around the axle 330 as the motor moves along the circular track 302. The drive 360 only requires a single track 302, because of the added support provided by the moment arm. Motor assembly 301 can operate with a single pinion gear 306, because there is only one track 302. Because only a single track 302 is involved, the problem of providing differential movement of the pinions about the two tracks is obviated. Also, the motor assembly 301 need not be mounted rigidly to the rail 302. The moment arm 303 holds the motor assembly 301 in place with respect to the axle 330. Instead of the flanged wheels 207 that lock the assembly 201 to tracks 202 and 203, motor assembly 301 can use rollers or bearings that merely rest on the track 302.

With the moment arm 303 present but only a single track 302, a different power transmission technique is used to provide power to the motor assembly 301. For example, in FIG. 15, the axle 330 has first and second commutators 331 for providing power and ground, respectively, to the motor assembly 301. The moment arm 303 has a pair of brushes or rolling surface contacts 333 that form power and ground connections with the first and second commutators 331, respectively. Rolling surface contacts cause less wear on the commutators 331, and may be preferred for that reason. The rolling surface contacts 333 may be spring loaded to ensure adequate contact with the commutators 331. Inside the moment arm, lines (not shown) are provided to transmit the power to the motor assembly 301.

With a moment arm 303, it is possible to have a motor located in the axle 330 provide the torque to rotate a weight around the circumference. However, the configuration in FIGS. 14 and 15 has the advantage that a motor that provides a much smaller torque can be used if the motor is located near the circumference. The configuration of FIGS. 14 and 15 also provides better positioning accuracy and less wear on the motor than placing a high torque motor in the center axle 330.

Other moment-based systems may be used to rotate the wheel 114 and/or array assembly 310. For example, a motor at the circumference of the radar array 112 may drive a roller or gear that engages the inner circumferential surface of wheel 114, causing the wheel to roll without rolling the radar array 112. This technique has the advantage that processing the array signals is simpler, because the array does not rotate about its axis "A" when the wheel 114 rolls. This variation may include, but does not require a second wheel 132. It is possible to support the end of axle 130 opposite the radar array 112 using a universal joint or the like.

Alternatively, a motor in or coupled to the axle may apply a torque to rotate the wheel 114 and/or radar array 112 relative to the motor. This variation also would not require a second wheel 132 and could support the axle 130 through a universal joint. It would, however, require a motor capable of producing a greater torque than the other methods described above.

One of ordinary skill in the art can readily construct other drive mechanisms suitable for revolving radar array 112 about the platform 150.

Angular Position Sensing

It is important for the processing of any signals received by the array 112, and for any servomechanism used to rotate or position the array, to know the position of the array 112 in azimuth, and the array's angular orientation at any given time as it rotates about its own axis "A". The array angle determination is unique to an array that rotates about its own central axis.

In a system where the circumferential length of the first track 152 is an integer multiple of the circumferential length of the first wheel 114, the azimuth angle serves as a relatively crude measure of the rotation angle of the radar array 112 about its axis "A." However, over time, positional errors (e.g., due to wheel slippage on the track 152) could add up so that the rotation angle measurement is out of tolerance.

In a more general rolling axle array system 100, it is not desirable to restrict the circumference of the track 152 to even multiples of the circumference of wheel 114. In other words, the radius of platform 150 is not restricted to an even multiple of the radius of wheel 114. In this more general case, there is no one-to-one correspondence between azimuth angle and array rotation angle. The array 112 can revolve in the same direction about the axis "B" of the platform 150 any number of times, and each time there is a different array rotation angle when the array 112 passes through the zero azimuth angle position. Although it is theoretically possible to determine the rotation angle if the complete history of the rotation of the array 112 is known, such a measure would be subject to the same positional errors mentioned above for the integer relationship between track and wheel circumferences. Therefore, it is desirable to make a direct measurement of the rotation angle of the array.

It is desirable to achieve this position determination without adding any mechanical links between the array assembly 110 and its stationary platform 150. (For purpose of describing the angular position sensing system, the reference numerals of FIGS. 1–9 are used, but similar techniques may be used with the systems of FIGS. 10–15). Either an active system or a passive system may be used for this purpose.

Axle Mounted Optical Bar Code

Figure 16B:
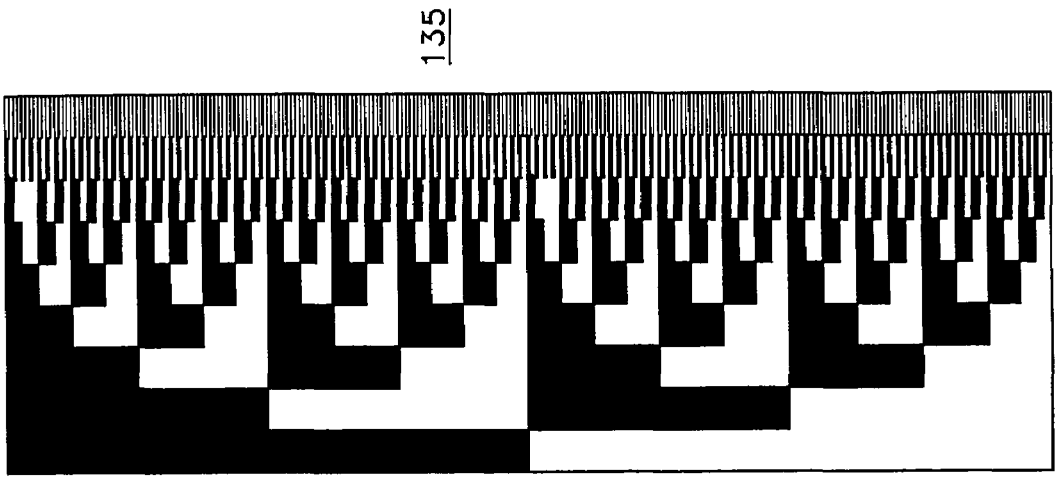
FIG. 16B shows the bar code pattern of FIG. 16A "unwrapped," with zero degrees at the top and 360 degrees at the bottom.
Figure 16A:
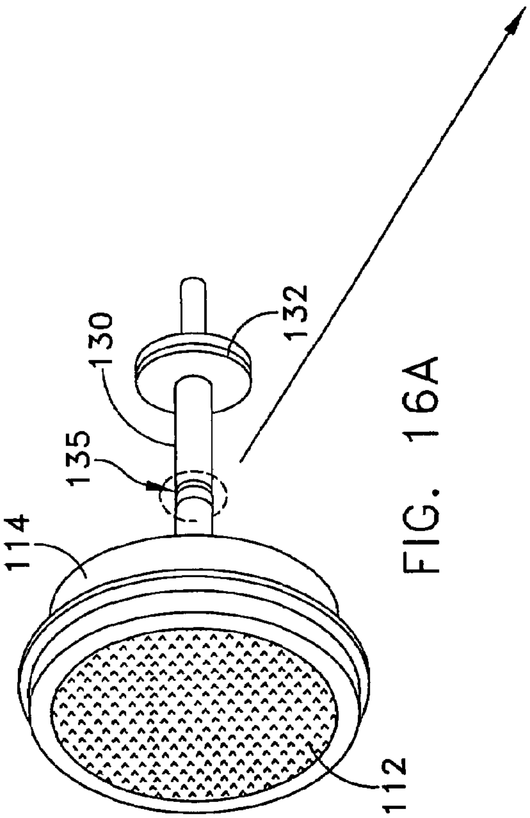
FIG. 16A is an isometric view of an array assembly having a bar code pattern on the axle.
Figure 17:
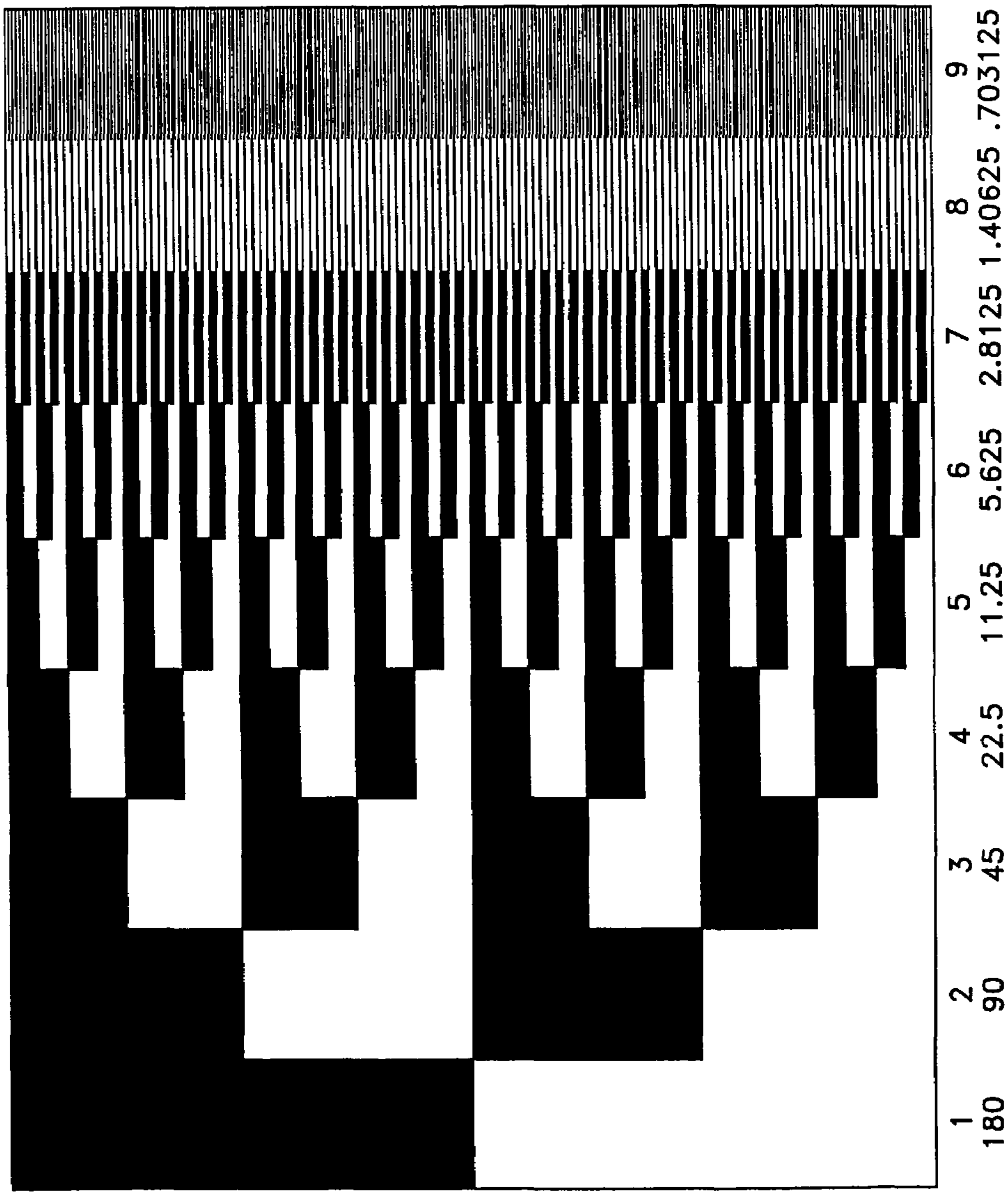
FIG. 17 is a stretched view of the bar code of FIG. 16B, showing the precision attainable with each additional bit of data.

Reference is again made to FIGS. 4–6, which show a first exemplary position sensing system using an axle mounted bar code 135. FIG. 16A shows an exemplary marker—bar code 135—that can be read by the system in FIGS. 4–6. The marker 135 wraps completely around a perimeter of the axle 130, allowing measurement at any array rotation angle. FIG. 16B is an enlarged detail of FIG. 16A, showing the bar code 135 in an "unwrapped" state, laid flat. FIG. 17 is an exaggerated view of the bar code 135, in which the horizontal dimensions are exaggerated to better show the angular resolution and the correspondence between bits and degrees of precision. The first column has two bars, the second column has 4 bars, and so on. The angle resolution (in degrees) is equal to $360/2^b$, where b is the number of columns of bars. With nine columns of bar codes, resolution down to 0.7 degrees is achieved. In practice, 12 or 13 columns or more may be used, to achieve precision of 0.09 or 0.04 degrees, respectively. The bar code at any angular position is read by scanning across the bar code 135 in the direction parallel to the axis "A" of the array 112. Given the orientation shown in FIG. 17, a horizontal row of the bars is scanned. (It is understood that in operation, the array 112 and the marker 130 can be tilted in any orientation). The code read has nine bits, each identified by a black or white region. The corresponding rotation angle is easily determined from this binary representation of the angle.

Referring again to FIGS. 4–6, the bar code reading mechanism may be conveniently located on the azimuth drive brackets 162. The position sensing system for radar array 112, comprises a marker, such as bar code 135 located on a portion of array assembly 110, and an optical sensor 136 that detects the marker to sense an angular position of the radar array, as the radar array rotates about its axis "A" normal to a radiating face of the radar array 112 during operation.

In the example of FIG. 4, the marker 135 is located on an axle 130 of the array assembly 110, which is in turn connected to the wheel 114, on which the radar array is mounted on the wheel. In other embodiments (not shown), the marker may be positioned in other locations that can be read to provide an angle measurement, including, but not limited to, markings on either the first wheel 114 or the second wheel 132, or the rear face of the housing of the radar array 112.

In the system of FIGS. 4–6, the marker 135 includes the optical bar code pattern of FIGS. 16A, 16B and 17, and the optical sensor 136 may include a conventional scanner, such as a bar code reader. The bar code reader can be positioned at any location on the assembly that revolves around the platform 150 with the radar array 112, but does not rotate about the axis "A" of the array. For the bullring gear drive system of FIGS. 3–9, the sensor 136 can be mounted to the movable portion 172 of the bullring gear, the platform 167, or to any structural members attached to the movable portion 172 or the platform 167. In the example, two optical sensors 136 are attached to a portion of a drive system that causes the array assembly 110 to rotate, namely, the bracket portions 162. This location is convenient because it allows the sensor 136 to be placed very close to the bar code. The system can be operated with a single bar code reader 136, and the second unit can be provided for redundancy. Alternatively, the second reader 136 may be omitted.

One of ordinary skill can readily determine a desirable location to mount an optical sensor 136 corresponding to any given location of the marker 135. For example, in a smaller array (not shown) where the bullring gear 170 can be near the circumference of the platform 150, the marker can be placed on the circumferential surfaces of the first wheel 114 (e.g., behind flange 118). In this configuration, the sensor 136 may be positioned on the movable portion 172 of the bullring gear 170, or on a platform 167, with the sensor facing up towards the circumferential edge of the array.

Figure 18:
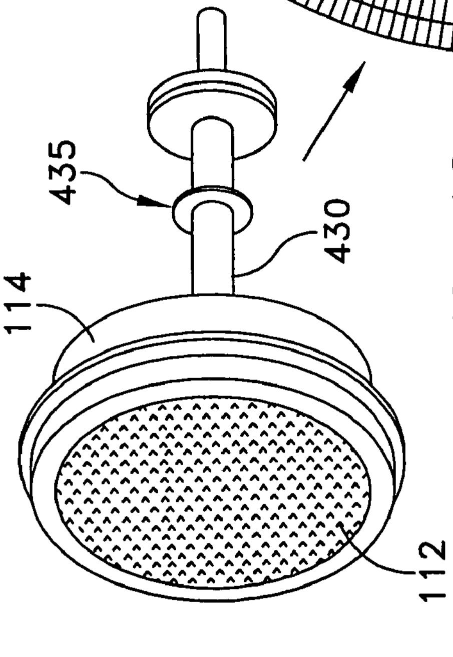
FIG. 18 is an isometric view of an array assembly having an optical encoding disk on the axle.
Figure 20:
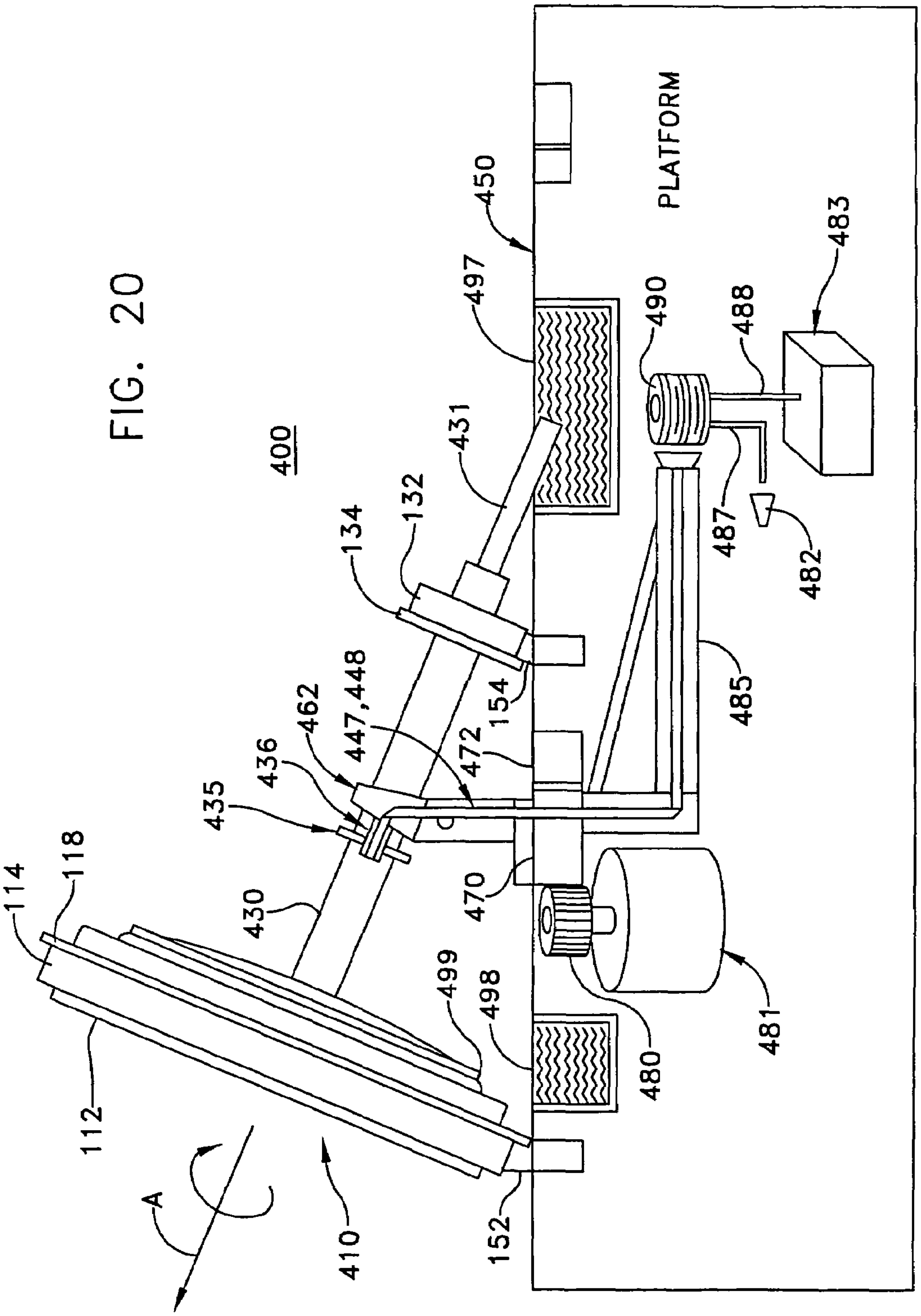
FIG. 20 is a side elevation view of a system including the optical encoding disk of FIG. 19, with an optical reading apparatus and a passive fiber optic link.

Alternatively, the marker may be a disk shaped pattern placed on the rear surface of the radar array 112 itself, in which case the sensor 136 can be mounted on one of the brackets 162 facing the array, or on a separate bracket coupled to movable ring portion 172. (An exemplary disk shaped pattern is described below in reference to FIG. 18). Or the marker may be applied to the front surface of the second wheel 132, in which case the sensor can be mounted on the rear of the bracket 162, or on a separate bracket coupled to movable ring portion 172.

Although the exemplary embodiment of FIGS. 16A, 16B and 17 is an optical bar code 135, other markers may be used. For example, instead of bar codes, the marker may contain machine readable characters. Alternative embodiments include areas having a plurality of respectively different gray scale measurements, or a plurality of respectively different colors.

Although the optical bar code 135 is read by sensing reflected light, it would also be possible to replace the white regions of the pattern with transparent regions. Then the pattern could be illuminated from inside the axle, without using the scanner 136 to provide illumination. Techniques for processing light from a backlit pattern are discussed in greater detail below, with reference to FIGS. 18–23.

The optical bar code system described above maintains the desired freedom from mechanical links encumbering the rolling array assembly 110, so that the assembly is free to roll around the tracks 152, 154.

Angular Position Sensing Using an Optical Encoding Disk.

As noted above, the optical sensor 136 is active. It shines a light on the bar code 135, receives a reflected pattern, and transmits a signal representing the pattern back (for example, using an optical link) to a receiver for use in processing the signals returned by the radar array 112. Alternative systems transmit the raw light data back for processing in the system signal processing apparatus.

Figure 19:
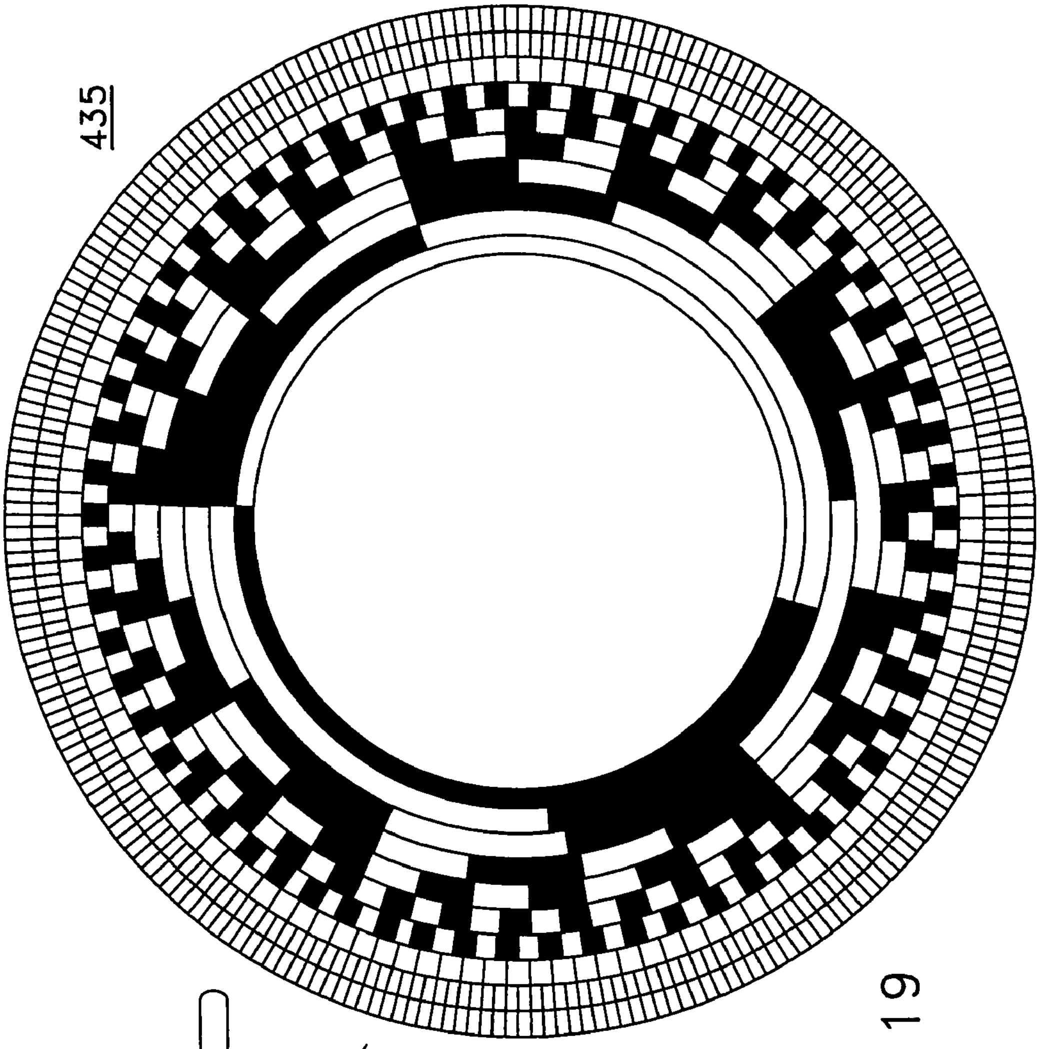
FIG. 19 is a front elevation view of the optical encoding disk of FIG. 18.

FIGS. 18–24 shows a radar array assembly 410 having a variation of the angular position sensing system using an optical encoding disk 435. Components in system 410 that can be the same as the components of FIGS. 3–9 have the same reference numerals, and descriptions of these common elements are not repeated. The marker in assembly 410 is a pattern on an optical encoding disk 435 that is mounted to the axle 430 and lies in a plane orthogonal to the axle. As best seen in FIG. 19 (in which radial dimensions are exaggerated for ease of viewing), the optical encoding disk 435 has a binary pattern similar to the pattern 135 of FIG. 17, rearranged in polar coordinates.

The first ring has two bars, the second ring has 4 bars, and so on. The angle resolution (in degrees) is equal to $360/2^b$, where b is the number of rings. With nine rings of bar codes, resolution down to 0.7 degrees is achieved. In practice, 12 or 13 columns or more may be used, to achieve precision of 0.09 or 0.04 degrees respectively. The bar code at any angular position is determined by reading radially across the bar code 435. The corresponding rotation angle is easily determined from this binary representation of the angle.

The disk pattern 135 has an inherent advantage over the rectangular pattern 135, in that, as the radius of a ring of bars increases, the circumference of that ring increases proportionately. By placing the least significant bits (bars) of the pattern on the outermost ring, a greater width is provided for each bar. This makes it inherently easier to have clearly defined bars in the least significant bit position, even when there is a larger number of rings (i.e., greater bit precision). Although it is possible to arrange the disk with the most significant bits on the outside rings and the least significant bits on the inside, such configurations are less preferred.

Another difference between the exemplary optical encoding disk 435 and the pattern 135 is the presence of transparent regions in the disk 435. Instead of black and white regions, the disk 435 has opaque (preferably black) regions and transparent regions. The disk 435 may be, for example, a transparent film on which an opaque pattern is printed, or an opaque layer deposited and etched. Alternatively, the disk 435 may be a photographically developed film.

Because the optical encoding disk 435 is flat, it is easy to shine a collimated light through the transparent regions of the disk, throughout the range of rotation angles of the optical disk. Because transmitted (and not reflected) light is used, there is no need to illuminate the optical encoding disk 435 with a scanner. Instead, the light pattern can be read directly using the disk reader 436. As in the case of the axle mounted bar code of FIG. 17, only one reading device 436 is needed for operation. A second reading device 436 may be provided for redundancy.

The optical reader 436 is best seen in FIGS. 21–24. The optical reader 436 includes a light source 440 that directs light through the transparent regions of the disk 435, and a passive optical receiver 442. Light that is incident on the opaque regions is blocked. In the example shown in FIG. 24, the light source 440 is an optical fiber source array comprising a plurality of optical fibers 441, each transmitting a collimated beam of light to the surface of the optical encoding disk 435. The passive optical receiver 442 is an optical fiber receive array comprising a plurality of optical fibers 443, each aligned with a respective one of the optical transmit fibers 441. Each receive fiber 443 is positioned to receive an individual beam of light from a corresponding light source fiber 441 when a transparent bar on the optical encoding disk 435 passes between that source fiber—receive fiber pair.

Figure 21:
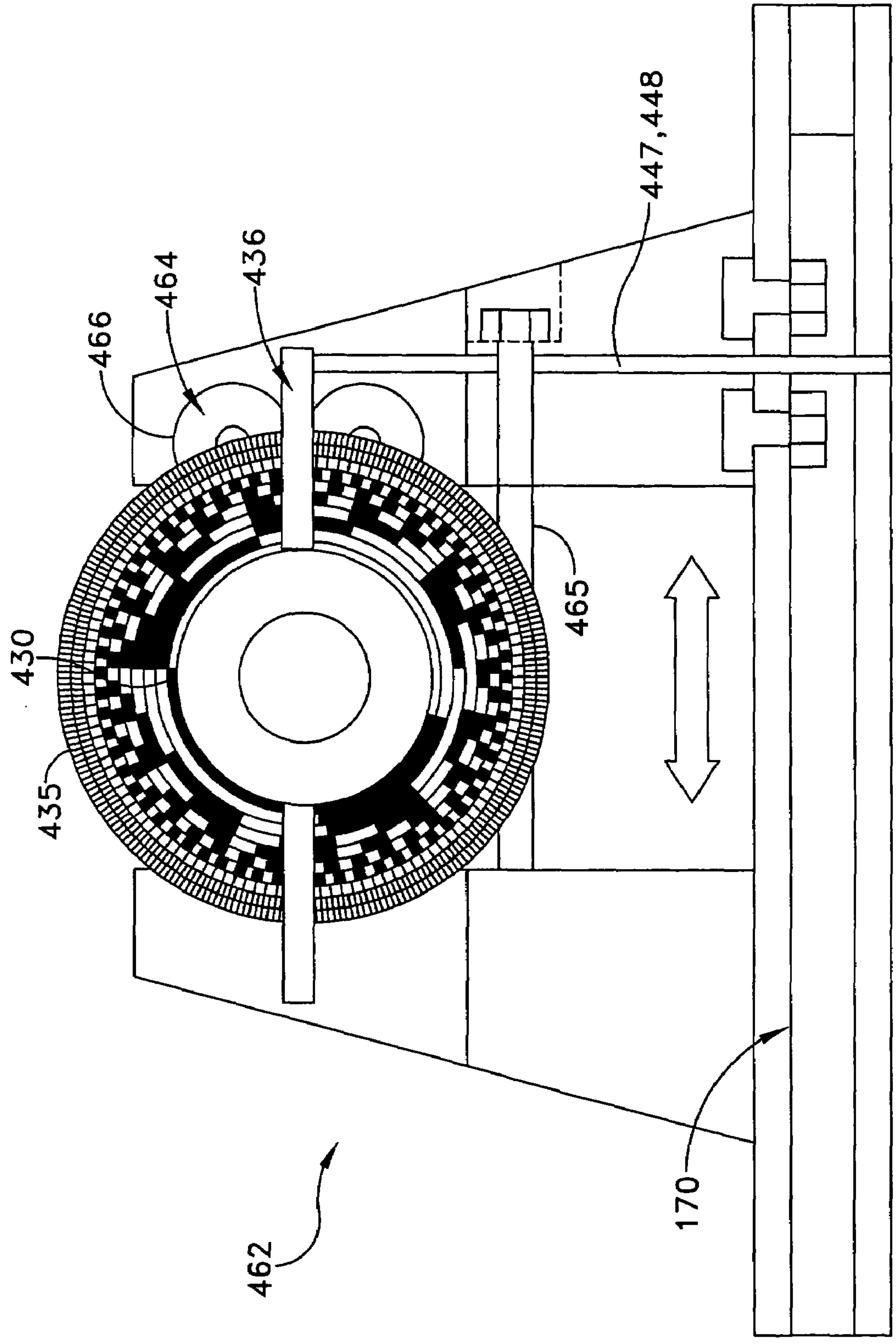
FIG. 21 is a front elevation view of the bracket assembly of FIG. 20.
Figure 22:
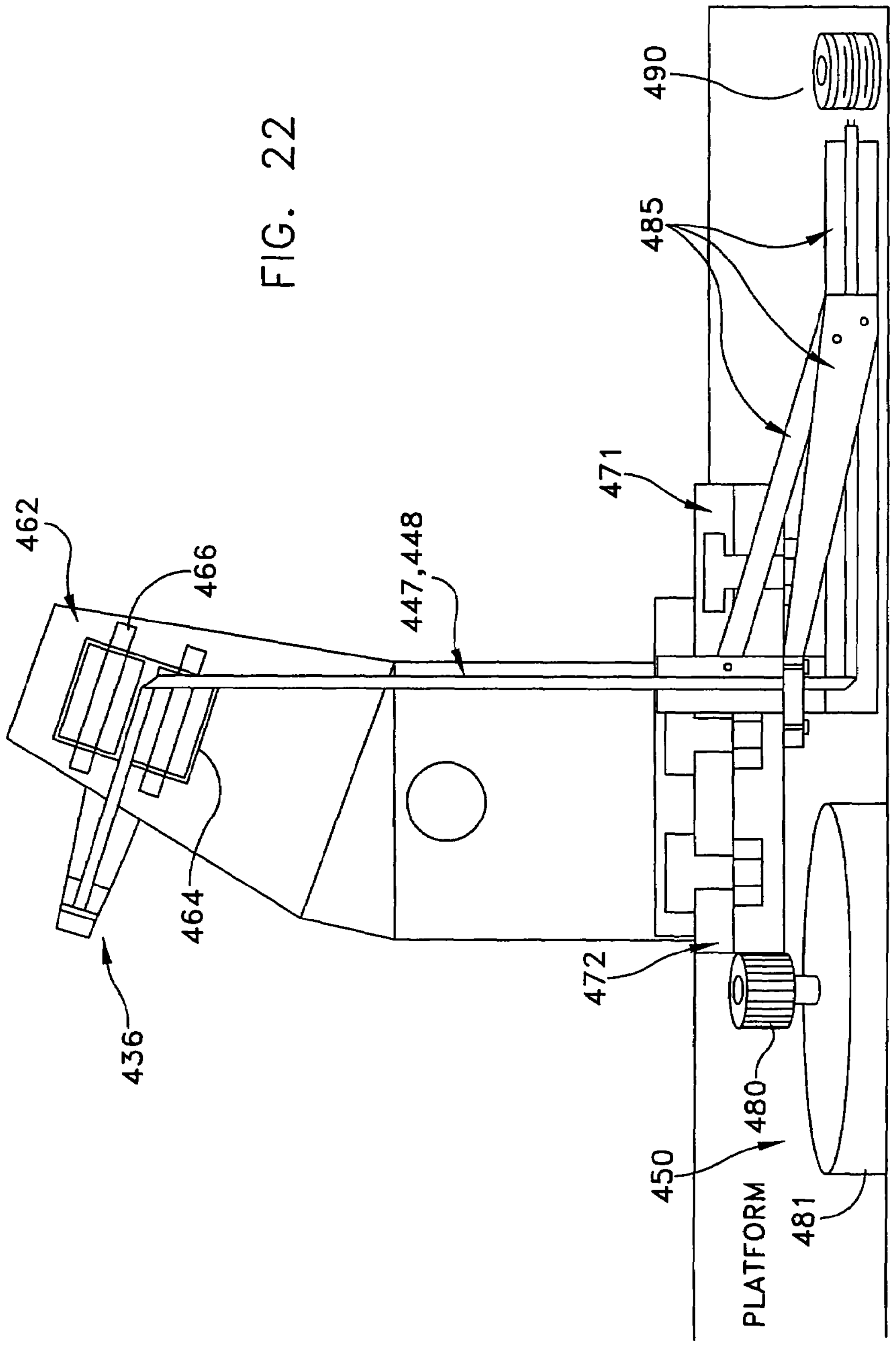
FIG. 22 is an enlarged detail of FIG. 20.
Figure 23:
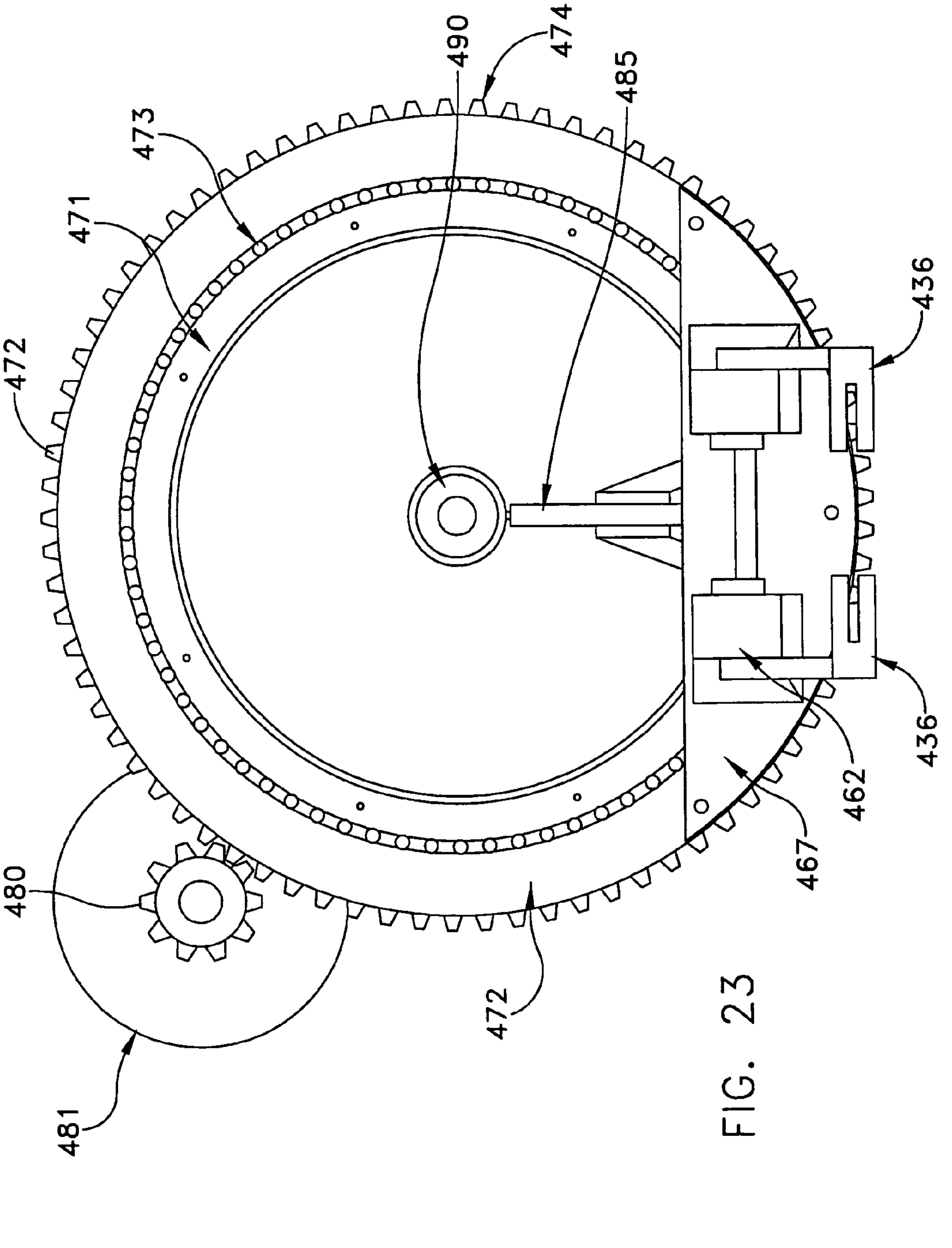
FIG. 23 is a plan view of the assembly of FIG. 20.

As shown in FIGS. 21–23, the exemplary optical reader 436 is located on a portion 462 of the drive mechanism. More specifically, in a drive mechanism that includes at least one bracket 462 portion that pushes against the axle 430 in a tangential direction, the optical sensor 436 can advantageously be located on the bracket portion.

Figure 29:
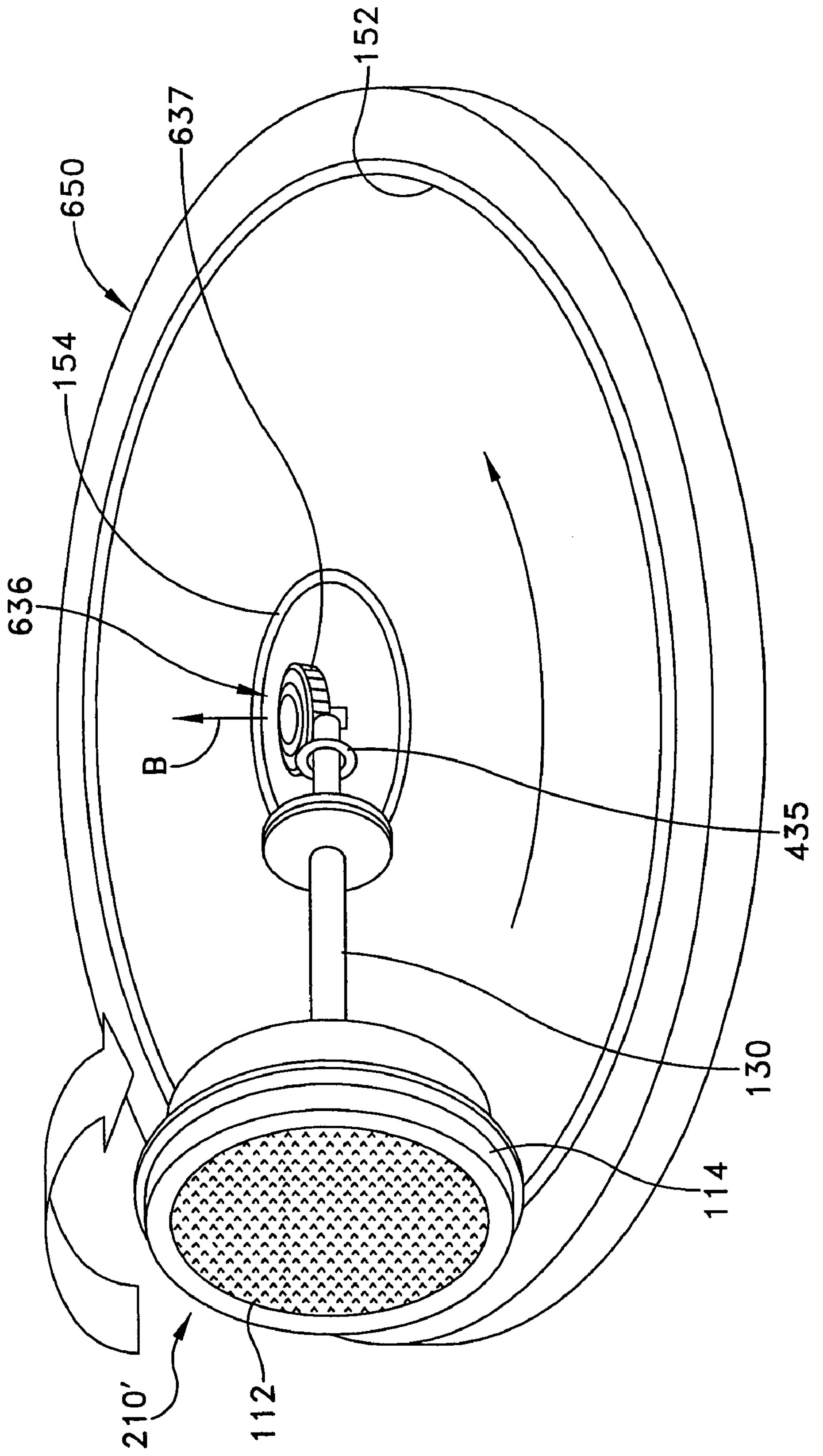
FIG. 29 shows a variation of the system, including a central stationary optical reader for reading the optical encoding disk of FIG. 19.

In the gravity drive systems shown in FIGS. 10–15, or other systems that do not include brackets 462, other types of angle sensing mechanisms may be used. For example, FIG. 29 shows a system 210', which is a variation of the gravity driven system 210 of FIGS. 10–15. The optical disk 435 of FIG. 19 has been added to System 210'. An optical coupler 636 mounted on platform 650 reads the code on the optical disk 435 to determine the rotational position of array assembly 210 as the array assembly 210' revolves around the optical coupler. The optical coupler 636 may include, for example, a plurality of scanners or bar code readers 637 arranged around its circumference. The sensors 637 may also be used to determine the azimuth position of the array assembly 210'. The sensors 637 each have respective fixed azimuth positions with respect to the platform 650, so identification of the sensor that is currently scanning the disk 435 also identifies the azimuth position.

Figure 30:
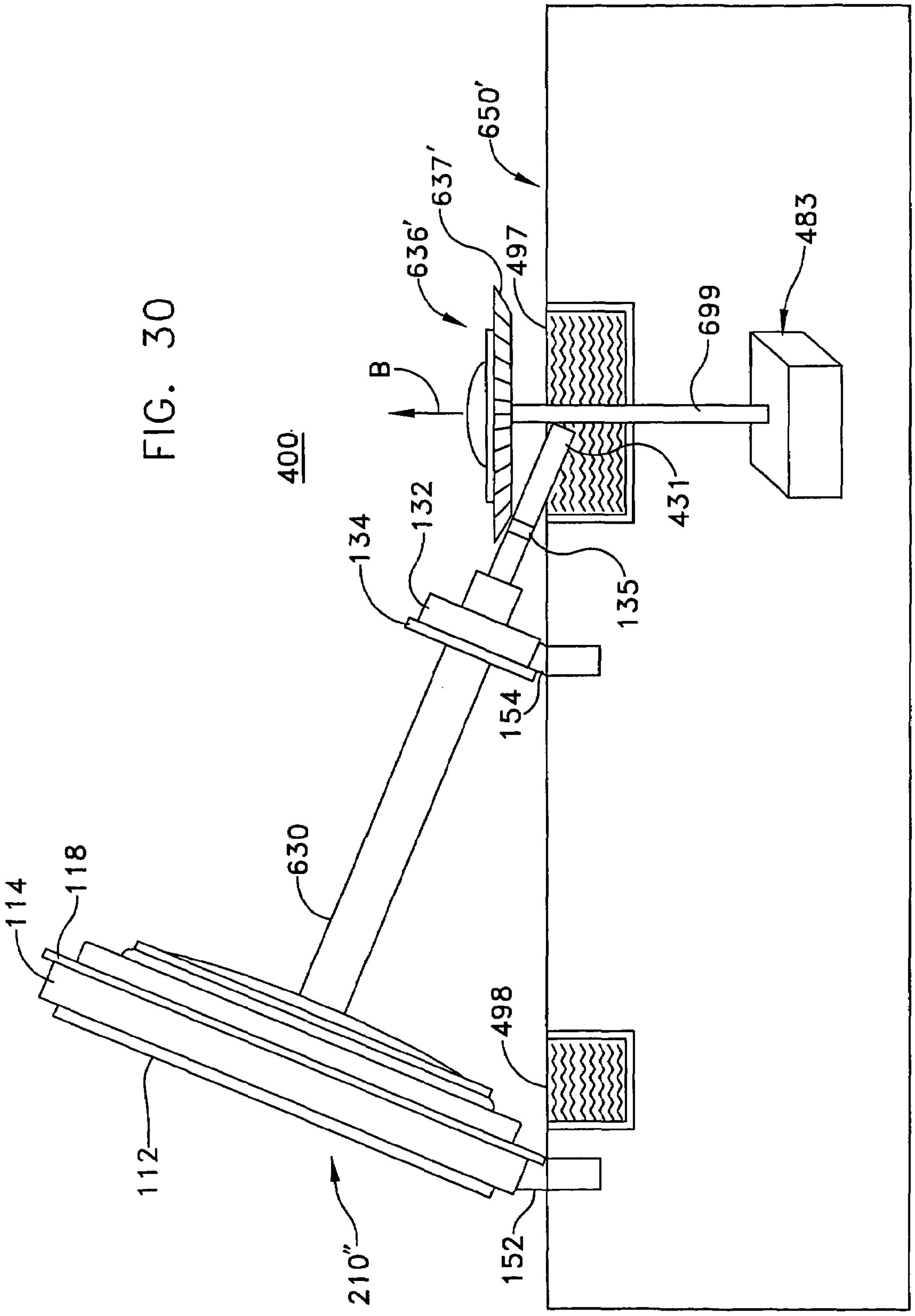
FIG. 30 shows a another variation of the system, including a second central stationary optical reader for reading the axle mounted bar code of FIG. 16B.

FIG. 30 shows another system 210" which is a variation on the system shown in FIG. 29. In system 210", the gravity drive system of FIGS. 10–15 is used in conjunction with the axle mounted bar code 135 of FIGS. 16A and 16B. A bar code reader 636' is mounted at the axis "B" of the platform 650'. The optical reader 636' of FIG. 30 is similar to the reader 636 of FIG. 29, except that the orientation of the sensors 637' is optimized for reading the bar code 135 from the axle, instead of from the optical encoding disk 435. An optical coupling 636' similar to coupling shown in FIG. 30 may be used to read a bar code (not shown) mounted on the cone shaped housing 715 or the frustum shaped housing of the array assembly shown in FIG. 33.

Figure 31:
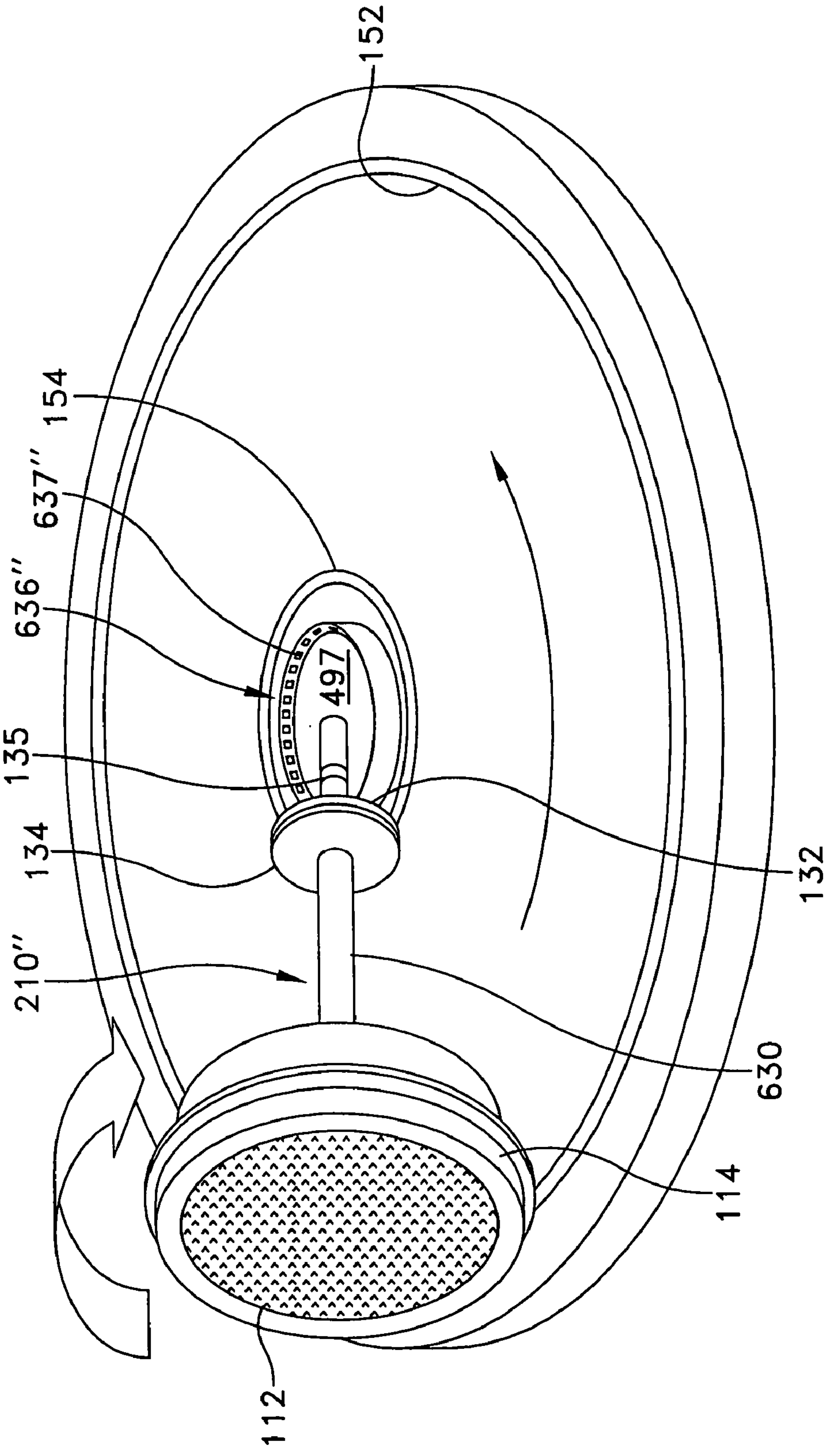
FIG. 31 is an isometric view showing another variation of the system, including a third central stationary optical reader for reading the axle mounted bar code of FIG. 16B.
Figure 32:
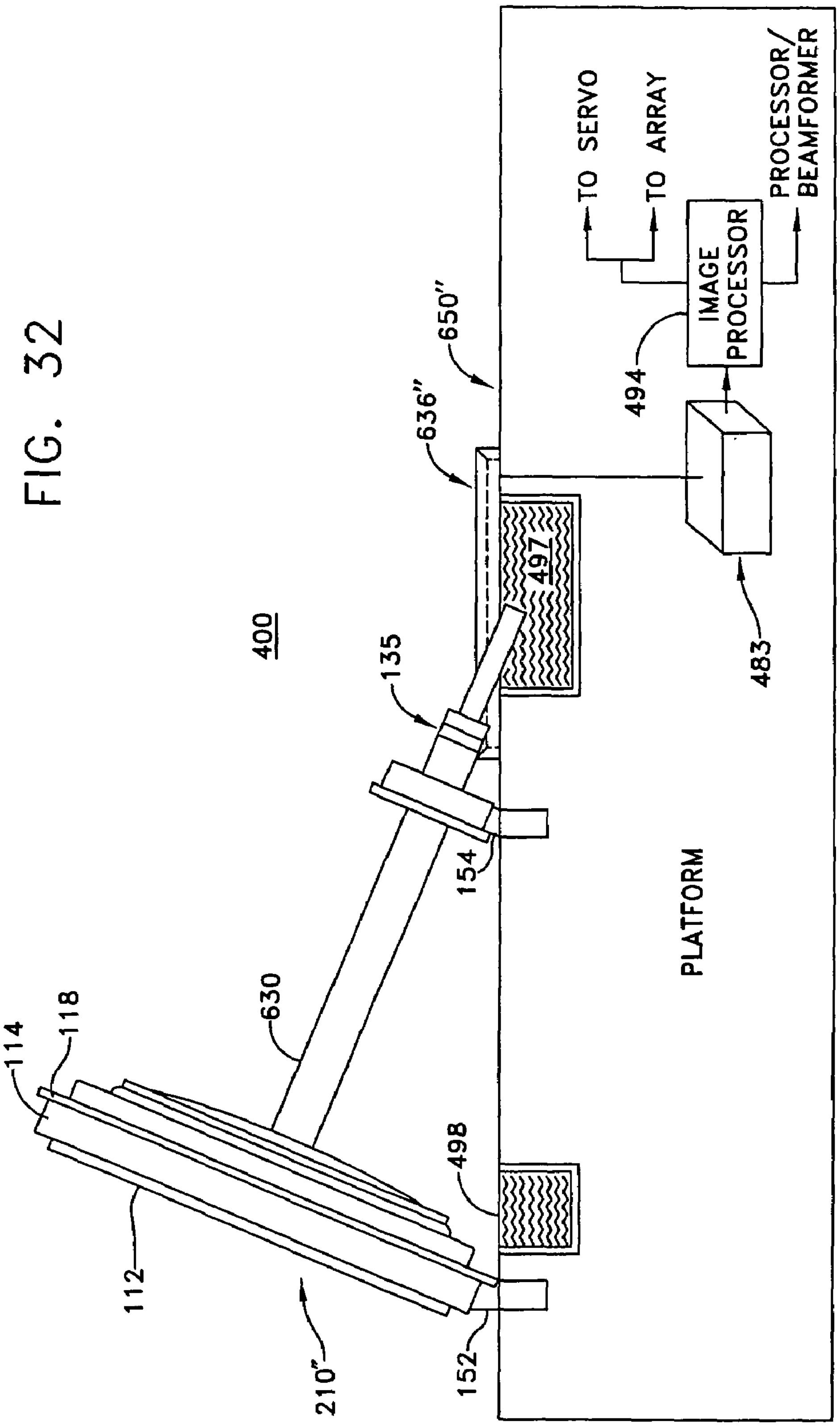
FIG. 32 is a side elevation view of the system of FIG. 31.

Alternatively, FIGS. 31 and 32 show an optical reader 636" that is located below the axle 630, around the circumference of the reservoir 497, approximately at the level of the platform 650". As shown in FIG. 31, a plurality of optical sensors 637" arranged in a ring on the tilted top (inner) surface of the optical reader 636". The optical sensors face upwards towards the axle mounted bar code 135, and read the bar code at the bottom of the axle 630. The configuration of FIGS. 31 and 32 would not require a shaft to extend through the reservoir 497 (which is described in greater detail below with reference to the thermal control system). Because the optical reader 636" is mounted to the platform, it provides has a more stable mechanical mount, and may provide more accurate readings than the optical readers of FIGS. 29 and 30. An optical reader 636" may be mounted on the surface of the platform 650" as shown, or may be partially or completely imbedded in platform 650".

Alternatively, a bar code pattern (or other machine readable pattern) may be placed on the inner circumference of the wheel 114, and a sensor such as a scanner (not shown) may be placed on a pivotally mounted plumb line or member hanging downwardly from the axle 130 within the array. The sensor would at all times be directed radially downward toward the bar code pattern on the inner surface of the wheel 114 at the point of contact with the platform. Because the sensor would point downward at all times, while the barcode inside the circumference rotates, the sensor would provide a reference direction, from which the rotation angle of the array could be measured using the internal bar code.

One of ordinary skill can readily develop other alternative mechanisms for determining the angular rotation of the array 112.

Passive Fiber Optical Link

Figure 24:
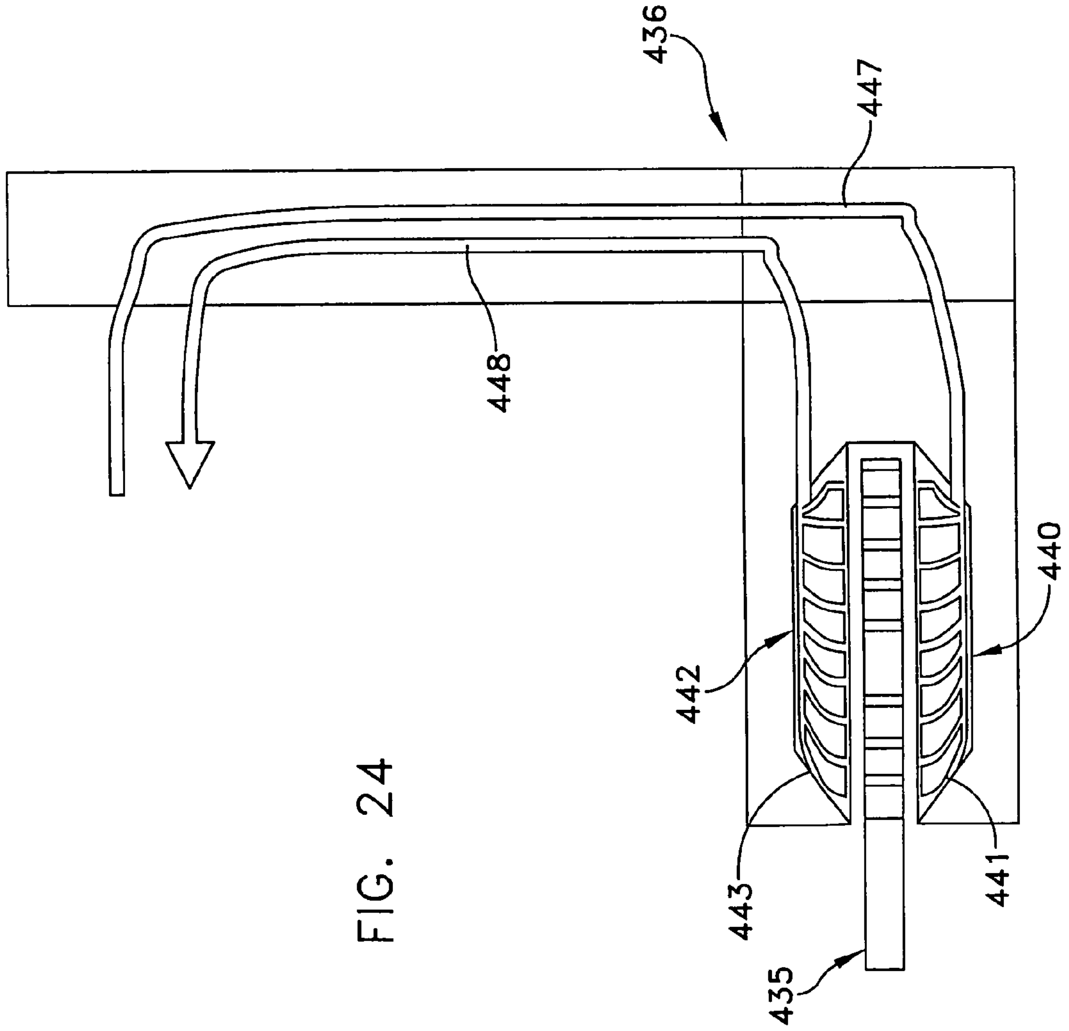
FIG. 24 is a cutaway plan view of the optical reader of FIG. 23.

As shown in FIG. 24, two bundles 447, 448 of fibers 441, 443 respectively pass through the housing of optical reader 436, to be transmitted to the signal processing apparatus. Transmission of the array rotation angle data through an optical link while the array assembly 410 is rolling and revolving presents additional design considerations, which are addressed below.

FIGS. 20–27 show a passive fiber optical link between the optical reader 436 and the signal processing apparatus (not shown) for the radar array 112. The exemplary fiber optic link transfers the light to and from the optical encoding disk 435 without adding any mechanical connections between the azimuth drive mechanism 160 and the optical source 482 or receiver 483. One complicating factor is that the radar array assembly 410 is rotating and revolving.

The system comprises at least one optical fiber (e.g., 447, 448) that revolves around an axis "B" when the array assembly 410 that includes a radar array 112 revolves around the axis "B". In the exemplary embodiment, there is a bunch of transmit fibers 447 and a bunch of receive fibers 448. The optical fibers 447, 448 receive a light pattern from the optical encoding disk 435 that specifies information from the array assembly. The system also includes a stationary device 490 that remains optically coupled to the revolving optical fibers 447, 448 for receiving the light pattern while the optical fiber(s) revolve around the axis "B". (Although the information in the exemplary embodiment specifies a position coordinate of the radar array—namely the roll angle of the radar array—a passive fiber link as described herein could also be used to transmit other information to and from the array assembly 410).

In FIG. 23, the movable portion 472 of gear assembly 470 is the outer ring, and pinion gear 480 is positioned outside of the movable gear 472. This clears the inside of the inner ring 471 (in this case, the fixed ring), so that the movable fibers 441, 443 and their support bracket 485 have unobstructed ability to sweep through the full range of azimuth angles without interference from the pinion gear 480 or motor 481.

For azimuth drive systems using the bullring gear 470 and pinion gear 480 arrangement, it is convenient to run the passive optical fiber link through the drive bracket assembly 462 for several reasons. The bracket assembly 462 maintains a position near to the axle 430 of the array assembly 410, and is a convenient mounting location for the optical reader 436. The bracket assembly 462 mounts to the bullring gear 470 and rotates with the gear, so that the positional relationship between the fiber bundles 447, 448 and the array assembly 410 are constant. Also, by running the optical fibers 447, 448 through the bracket assembly 462, interference between the fiber link and any of the components of the support platform 450 or any of the components of the radar array assembly 410 are avoided. Nevertheless, other fiber routing schemes are contemplated, as discussed further below.

The embodiment of FIGS. 20–27 avoids mechanical links in the optical fiber link. A device referred to herein as an "optical slipring" 490 provides one means of coupling a revolving fiber 447, 448 to a stationary fiber 487, 488 without a mechanical coupling. The optical slipring 490 is analogous to an electrical slipring that transmits power and/or signals from a stationary set of lines to a rotating set of lines. The optical slipring 490 is a bi-directional, all optical device. The exemplary optical slipring has the ability to handle multiple fibers, but other variations having any number of one or more fibers are contemplated.

The exemplary multi-layered optical slipring is mounted concentrically with the azimuth drive assembly. This positioning facilitates the ability for the movable fiber bundles 447, 448 to remain in constant optical communication with the optical slipring 490 as the array assembly 410, the movable ring portion 472 and the movable fiber bundles 447, 448 all sweep through the entire range of azimuth angles from zero to 360 degrees.

Figure 25A:
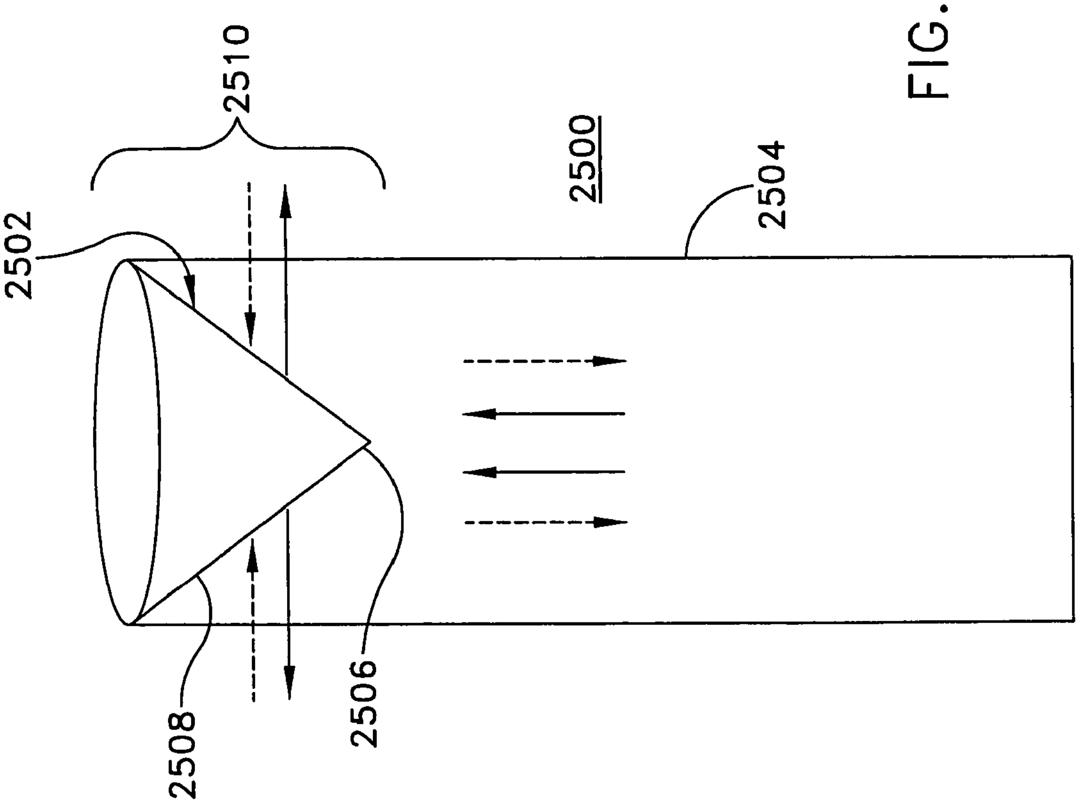
FIGS. 25A–25C show three methods to interface an optical fiber to a conical reflector.
Figure 25B:
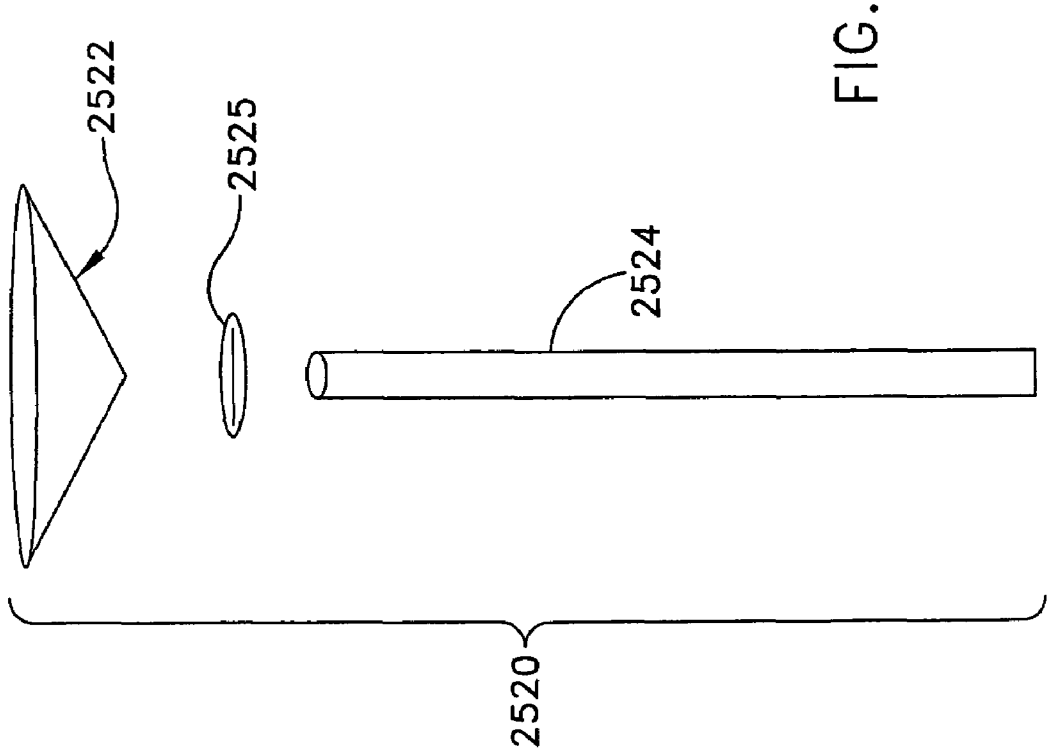
Figure 25C:
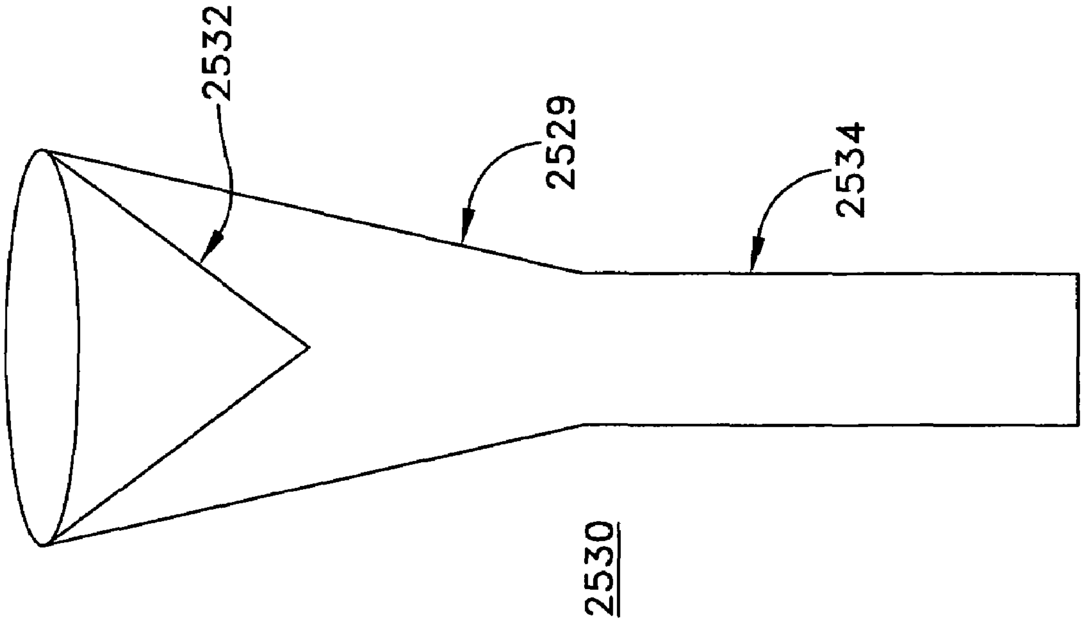

The optical slipring 490 uses the ability of a conical reflector to re-direct light. FIGS. 25A–25C show three interfaces between an optical fiber and a conical reflector. FIG. 25A shows a simple interface 2500, in which the optical fiber 2504 has the same diameter as the base of the conical reflector 2502. In such an interface, light moving vertically toward the apex 2506 of the conical reflector 2502 (indicated by solid arrows) is reflected and output horizontally (radially) in all angular directions. Light coming in horizontally from any radial direction towards the side 2508 of the conical reflector 2502 (indicated by dashed arrows) is reflected and output downward. This interface 2500 provides a conical reflector 2502 with a first optical path 2504 facing the apex 2506 of the conical reflector, and a second optical path 2510 perpendicular to the first optical path. The second optical path extends to a side surface 2508 of the conical reflector 2502 and has a 360 degree field of view. The device 2500 is essentially a single fiber optical slipring.

FIG. 25B shows another interface 2520. In FIG. 25B, if the fiber 2524 has a diameter that is smaller than the base of the conical reflector 2522, a selfloc lens 2525 can be used to diverge the light from being transmitted from the fiber to the reflector, or converge light being transmitted from the reflector to the fiber.

FIG. 25C shows another variation of the interface 2530. As shown in FIG. 25C, if the fiber 2534 has a diameter that is smaller than the base of the conical reflector 2532, a tapered optical fiber coupler 2529 can connect the fiber to the conical reflector.

Although a single fiber device 2500 as shown in FIGS. 25A–25C can transmit light in either direction, practical systems require a light source at one end and a receiver at the other end, and thus use separate lines for transmitting and receiving the light.

Figure 26:
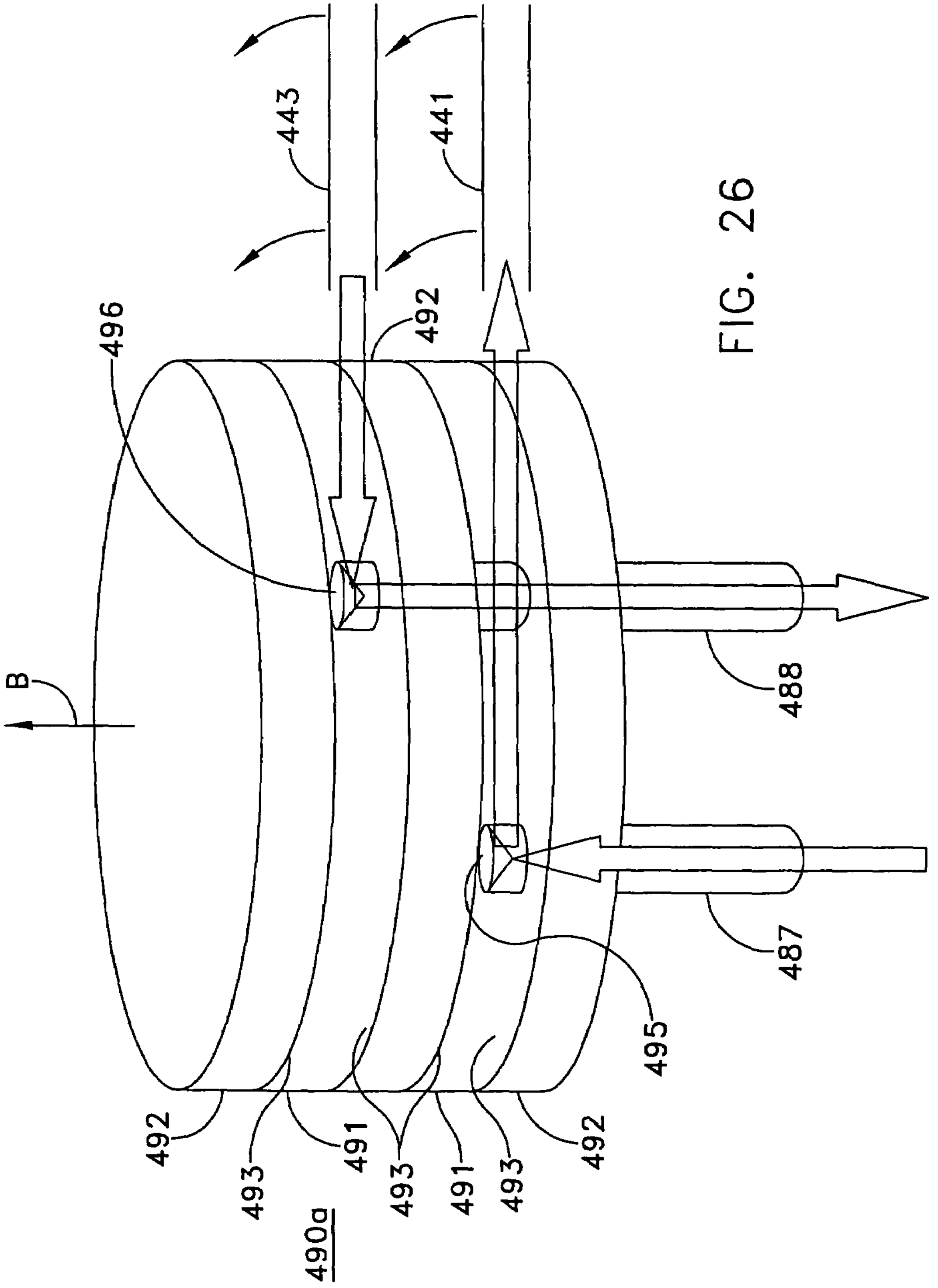
FIG. 26 shows a simplified optical slipring including two conical reflector interfaces of the type shown in one of FIGS. 25A–25C

FIG. 26 is a diagram of a simple multi-layer, full duplex optical slipring 490*a*. Although optical slipring 490*a* interfaces to fewer fibers 487, 488 than the optical slipring 490 shown in FIGS. 20 and 22, its function is identical. Optical slipring 490*a* has a plurality of disc shaped or annular transparent layers 491, with layers 492 therebetween. Transparent layers 491 may be made from conventional materials, such as glass or other materials suitable for use in optical fibers. Preferably, each layer 492 has a reflective surface 493 facing the transparent layer, to maximize the light that is re-directed and transmitted from the optical slipring 490*a*. The reflective surface may be disk shaped or annular. Each optical fiber 487, 488 terminates in a respectively different transparent layer 491.

Optical slipring 490*a* has a plurality of conical reflectors 495, 496 positioned at respectively different levels. Each conical reflector 495, 496 is at least partially located within a respective one of the transparent layers. At least the apex of each conical reflector 495, 496 is located within a transparent layer. (The base of each conical reflector can, but need not, be within a transparent layer, and can extend into a separation layer above the layer 491 in which the apex is located). The conical reflectors 495, 496 are aligned with respective input fibers 487, 488. None of the plurality of reflectors 495, 496 is axially aligned with any other one of the plurality of reflectors, in either the vertical or horizontal directions. For example, reflector 495 is coupled to fiber 487, and reflector 496 is coupled to fiber 488. Although FIG. 26 shows conical reflectors of the type shown in FIG. 25A, conical reflectors of the types shown in FIG. 25B or 25C may be substituted.

The interface from the stationary components (i.e., light source 482 and receiver 483) to the optical slipring 490*a* includes a first plurality of optical paths, 487 and 488 each facing the apex of a respective one of the conical reflectors 495, 496.

The interface from the moving components (e.g., sensor 436) to the optical slipring 490*a* include a second plurality of optical paths perpendicular to the first plurality of optical paths 487, 488. The second plurality of optical paths include the transparent layers 491. Each of the second plurality of optical paths 441, 443 extends from the outer circumference of a transparent layer 491 to a side surface of a respective one of the plurality of conical reflectors 495, 496 and has a 360 degree field of view.

The interface from the moving components also includes a plurality of movable optical fibers 441, 443, each capable of maintaining an optical coupling to a respective one of the second optical paths 491 during movement of that movable optical fibers. This is easily achieved if the optical slipring 490*a* is located along the central axis "B" of the system, and the movable fibers 441, 443 are radially aligned with the center of the transparent layers at all times.

The conical reflectors 495, 496 may be encapsulated within the transparent layer 491, so there is no air break or gap between the conical reflector and the transparent material of layer 491. To the extent that the separation layers 492 (with reflective surfaces 493) extend all the way to each fiber, they improve the optical isolation between the transparent layers.

Figure 27:
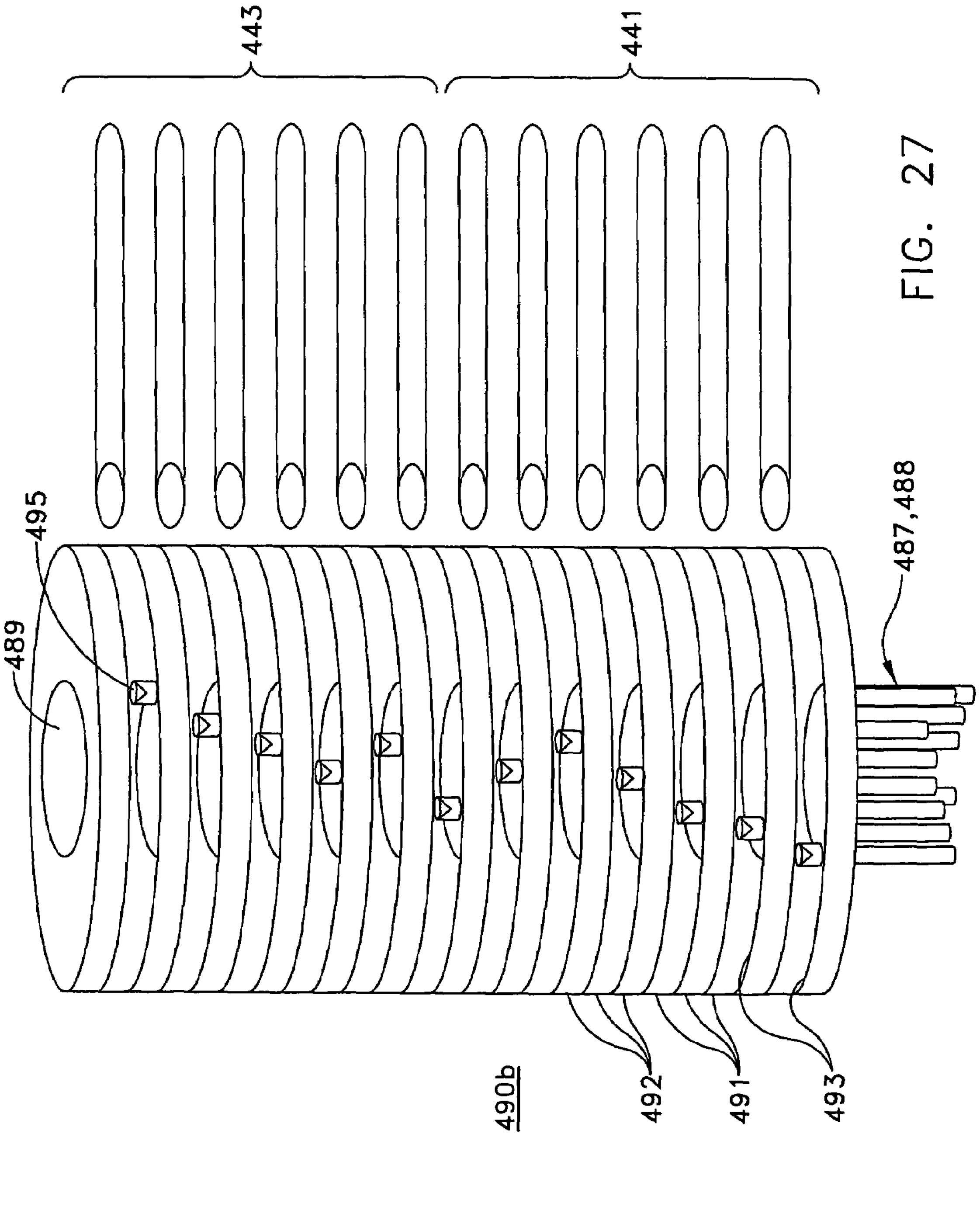
FIG. 27 is an enlarged view of an optical slipring having many fibers.

Alternatively (as shown in FIG. 27), the layers may be annular, with a cylindrical passage 489 therethrough. This passage may contain air, which minimizes undesirable refraction. The intent is that a portion of the light coming in from movable fiber 443 reaches the side wall of the conical reflector 496, and is reflected in the direction of the apex of reflector 496, so that a portion of the light reaches fiber 488. FIG. 26 shows the reflection while the movable fiber 443 is precisely aligned with the conical reflector 443. As the movable fiber 443 revolves around the optical slipring 490*a*, with the fiber radially oriented toward the axis "B," and the conical reflectors clustered near to the axis "B," the movable fiber 443 will not always point precisely at the conical reflector 496. Nevertheless, a sufficient amount of light from fiber 443 is dispersed through transparent layer 491 (and/or reflected from surfaces 493) so that a detectable light is reflected towards fiber 488.

Similarly, the light that is transmitted from fiber 487 to conical reflector 495 is scattered horizontally in all radial directions. A portion of this light will reach fiber 441.

FIG. 27 shows another optical slipring 490*b*, having multiple fibers 441 for transmitting light from the light source 482 (which may be a light emitting diode or laser) to the optical encoding disk 435, and multiple fibers 443 for transmitting light from the optical encoding disk 435 to the optical receiver 483. Although only six fibers are shown for each direction, any number of fibers may be used. Given the exemplary ten-bit resolution of the optical disk 435, a corresponding optical slipring 490 would have ten fibers in each direction. A separate fiber 441 supplies light to each respective ring of the optical encoding disk 435. A separate fiber 443 returns the signal (light or no light) from each respective ring of the disk 435. Thus, optical slipring 490 should have twice as many fibers as the number of rings (bits of precision) for optical encoding disk 435.

Although the exemplary embodiment uses the optical slipring 490 beneath the platform 150 in combination with the bullring gear azimuth drive, there are other applications for the optical slipring. For example, in another embodiment (not shown) a light source could be pivotably suspended on a plumb line or member beneath the axle mounted bar code 135 of FIG. 16A. If the bar code 135 consists of transparent and opaque regions, then the light pattern shining through the bar code could be directed on an optical slipring inside the axle. Then the angle position signals could be transmitted down the length of the axle, if desired.

Figure 28:
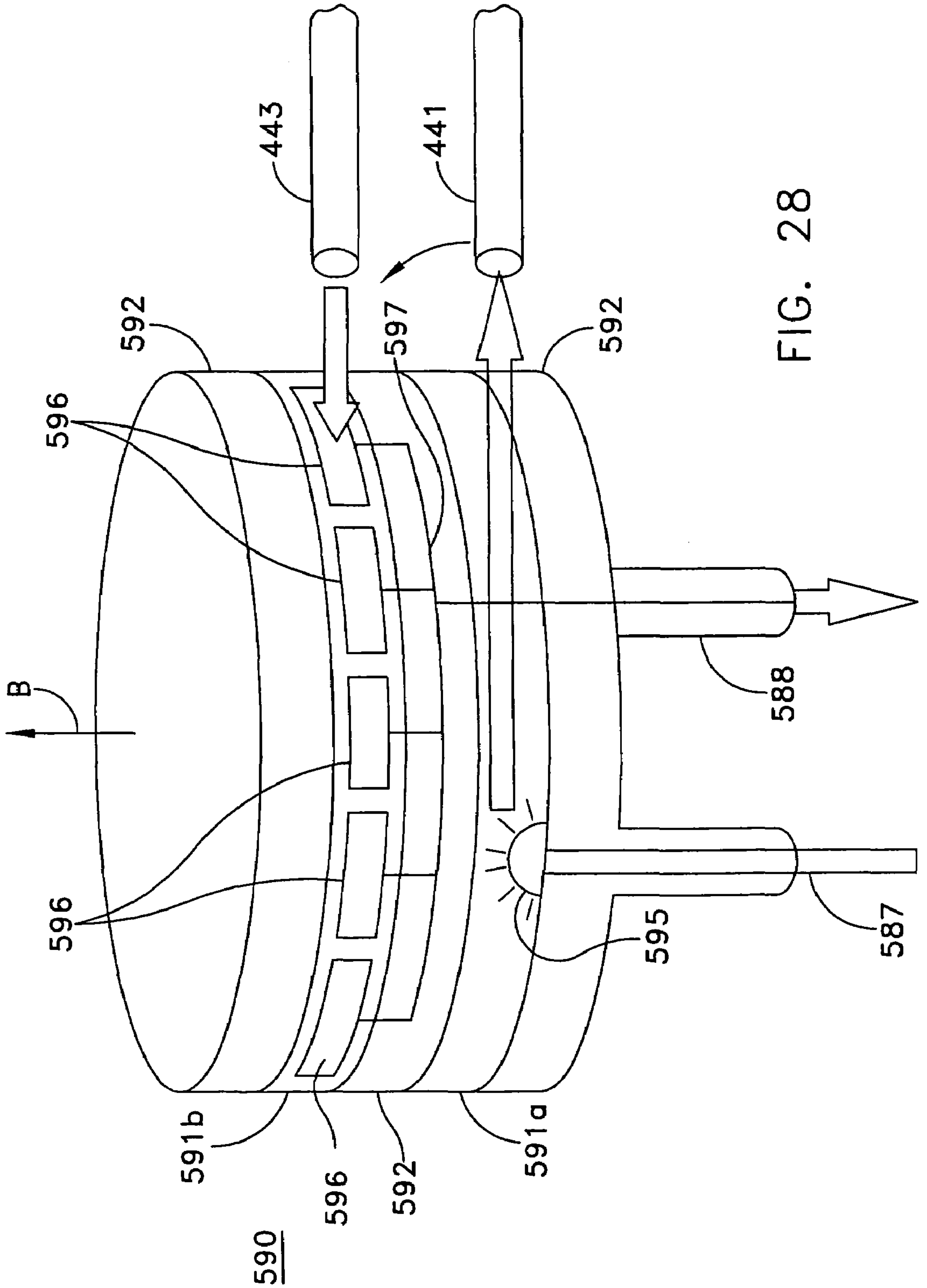
FIG. 28 is a simplified electrical-optical slipring that can be used in place of the optical slipring of FIG. 20.

Reference is now made to FIG. 28. Although the exemplary device 490 is all optical, other variations are contemplated. For example, the optical slipring 490 may be replaced by optical-electrical slipring 590. Instead of having a conical reflector for each transparent layer, a respective light emitting diode 595 may be provided in each of the transparent light emitting layers 591 a to transmit light in all directions. A plurality of photo detectors 596 may be placed around the circumference of each receiving layer 591*b*, which may or may not be transparent. Then electrical signals could be transmitted via line 587 to the optical-electrical device 590 (in place of transmitting light beams from light source 482) and a receiving line 588 can carry an electrical signal to an electrical, circuit, or processor (not shown) in place of the fiber optic receiver 483. In this variation, the signals between the bar code reader 436 and the electrical-optical slipring 590 via lines 441 and 443 are all optical. Meanwhile, all signals between the electrical-optical slipring 590 and the signal processing apparatus via lines 587 and 588 are electrical. Note that this variation only affects the stationary components of the system 400. The movable fibers 447, 448 and other moving components of the array assembly 410 and angle sensing system remain unchanged.

Although the example of FIGS. 20–24 features an optical encoding disk, the light transmission technique of FIGS. 25A–27 may also be used with a backlit version of the axle-mounted bar code of FIGS. 16A and 17.

Thermal Control

Referring again to FIG. 20, the axle 430 has an extended tube 431 that extends into a cool liquid reservoir 497. The tube 431 can take in the cool liquid, circulate the liquid among the radar array assembly 410 to cool the assembly, and return heated liquid to the reservoir 497. Alternatively, a separate return path may be provided by allowing the fluid to drain from a rear portion 499 of the array assembly into a fluid return 498. One of ordinary skill can readily configure the liquid intake, circulation, and exhaust components interior to the axle 430 and tube 431, and the array 412. This configuration is advantageous because it provides cooling without running direct pipes through the platform to the array 112. No rotary fluid joints are needed. By centrally locating the reservoir 497, the tube 431 can access the reservoir at all azimuth angles.

Preferably, if the reservoir 497 is included, the optical slipring 490 is located beneath the reservoir.

In the embodiment of FIG. 30, where the reservoir 497 is included, but the optical coupler 636' is used, and optical slipring 490 is not present, the optical coupler 636' may be above the reservoir, with the receiver 483 below the reservoir. Because optical coupler 636' is stationary, it is easy to seal the entrance where the tube 699 of the optical reader passes through the reservoir 497.

Although the optical readers 636' and 636" of FIGS. 30–32 are shown in combination with the thermal cooling reservoir 497, these optical readers may also be used in systems that use other thermal control systems.

Although the exemplary embodiments include specific combinations of subsystems, the various components described above may be combined in other ways. In general, with adaptations, any of the subsystems (azimuth drive, angle sensing, light transmission, cooling) may be used in combination with any other subsystem. Although the exemplary azimuth drive, position sensing, light transmission and cooling subsystems are shown in examples that include the two wheel configuration of the array assembly, these subsystems may also be adapted for use in a single wheel embodiment, an embodiment having more than two wheels, or embodiments having the cone or frustum shaped housing.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A system comprising, at least one optical fiber that revolves around an axis when an array assembly that includes a radar array revolves around the axis, the optical fiber receiving a light pattern that specifies information from the array assembly; and a stationary device that remains optically coupled to the optical fiber for receiving the light pattern while the optical fiber revolves around the axis wherein the information specifies a position coordinate of the radar array, the position coordinate being a roll angle of the radar array.

2. A system comprising:

at least one optical fiber that revolves around an axis when an array assembly that includes a radar array revolves around the axis, the optical fiber receiving a light pattern that specifies information from the array assembly;

a stationary device that remains optically coupled to the optical fiber for receiving the light pattern while the optical fiber revolves around the axis, the stationary device comprising:

at least one conical reflector;

at least one first optical path facing the apex of the conical reflector; and at least one second optical path perpendicular to the first optical path, wherein the second optical path extends to a side surface of the conical reflector and has a 360 degree field of view.

3. A system comprising:

at least one optical fiber that revolves around an axis when an array assembly that includes a radar array revolves around the axis, the optical fiber receiving a light pattern that specifies information from the array assembly;

a stationary device that remains optically coupled to the optical fiber for receiving the light pattern while the optical fiber revolves around the axis;

the at least one optical fiber including a plurality of optical fibers; and the stationary device comprises:

at least one light emitting device that transmits light to the array assembly, and a plurality of light detectors positioned around a circumference of the device, so that the at least one optical fiber receiving the light pattern from the array assembly provides the light to one of the plurality of light detectors throughout the revolution of the one optical fiber.

4. A method for conducting light, comprising the steps of:

revolving a radially oriented optical fiber around the conical reflector;

directing a light beam through a first optical path towards an apex of a conical reflector;

re-directing at least a portion of the light beam using the conical reflector;

transmitting the re-directed portion of the light beam through a second optical path perpendicular to the first optical path, wherein the second optical path begins at a side surface of the conical reflector and has a 360 degree field of view; and transmitting the re-directed portion of the light beam from the second optical path to an input of the movable optical fiber while the movable optical fiber is revolving.

5. The method of claim 4, further comprising transmitting the re-directed portion of the light beam from an output of the movable optical fiber to an optical encoding disk that rotates with a radar array.

6. A method for conducting light, comprising the steps of:

revolving a movable optical fiber around a side optical path that extends to a side surface of a conical reflector and has a 360 degree field of view;

transmitting the light pattern from an output of the movable optical fiber to the side optical path while the movable optical fiber is revolving directing a light pattern through the side optical path;

re-directing the light pattem using the conical reflector; and directing the light pattern through a longitudinal optical path that extends longitudinally from the apex of the conical reflector.

7. The method of claim 6, further comprising transmitting the light pattern from an optical encoding disk that rotates with a radar array to the movable optical fiber.

8. The method of claim 6, further comprising transmitting the light pattern from the longitudinal optical path to a fiber optic receiver.

* * * * *